(12) United States Patent
Weinert et al.

(10) Patent No.: US 7,483,981 B2
(45) Date of Patent: Jan. 27, 2009

(54) SCALABLE VIRTUAL PARTITIONING OF RESOURCES

(75) Inventors: Alexander T. Weinert, Seattle, WA (US); Daniel M. C. Caiafa, Kirkland, WA (US); Brian R. Morin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 11/003,798

(22) Filed: Dec. 3, 2004

(65) Prior Publication Data

US 2005/0108362 A1    May 19, 2005

Related U.S. Application Data

(62) Division of application No. 09/632,382, filed on Aug. 3, 2000.

(51) Int. Cl.
G06F 15/173 (2006.01)
G06F 17/30 (2006.01)
G06F 13/28 (2006.01)

(52) U.S. Cl. .................. 709/225; 709/226; 711/150; 707/201; 707/8; 707/10

(58) Field of Classification Search .............. 709/225, 709/226; 711/150; 707/201, 8, 10
See application file for complete search history.

(56) References Cited

U.S. PATENT DOCUMENTS

| | | | | |
|---|---|---|---|---|
| 4,853,843 | A * | 8/1989 | Ecklund | 707/203 |
| 5,440,732 | A * | 8/1995 | Lomet et al. | 707/1 |
| 5,634,125 | A | 5/1997 | Li | |
| 5,794,039 | A | 8/1998 | Guck | |
| 5,933,825 | A * | 8/1999 | McClaughry et al. | 707/8 |
| 6,006,264 | A * | 12/1999 | Colby et al. | 709/226 |
| 6,052,697 | A | 4/2000 | Bennett et al. | |
| 6,078,990 | A | 6/2000 | Frazier | |
| 6,101,508 | A | 8/2000 | Wolff | |
| 6,108,715 | A | 8/2000 | Leach et al. | |
| 6,304,967 | B1 * | 10/2001 | Braddy | 713/150 |
| 6,411,985 | B1 | 6/2002 | Fujita et al. | |

(Continued)

OTHER PUBLICATIONS

"3.2 Query Routing Using Source Capability and User Query Profiles," http://www.computer.org/proceedings/meta97/papers/lliu/node5.html, pp. 1-2, Jul. 27, 2000.

(Continued)

Primary Examiner—Kevin Bates
(74) Attorney, Agent, or Firm—Klarquist Sparkman, LLP

(57) ABSTRACT

Resources are partitioned via a virtual partitioning system to distribute the resources over a plurality of resource servers. A virtual partition table can be kept at each of a set of resource managers handling requests for resources in tandem. When a resource is requested, a virtual partition value is calculated algorithmically, and the value is mapped to a resource component via the virtual partition table. The resource component encapsulates information indicating on which of the resource servers the resource resides and can provide a component for performing operations on the resource even though the requester does not have information about where the resource resides. The resources can be repartitioned by modifying the virtual partition table, thus allowing the addition of additional resource servers to the system while the resources remain available. Additional resource types can be added without reengineering the system.

19 Claims, 32 Drawing Sheets

U.S. PATENT DOCUMENTS

| | | | |
|---|---|---|---|
| 6,430,618 | B1 | 8/2002 | Karger et al. |
| 6,438,652 | B1 * | 8/2002 | Jordan et al. ............... 709/219 |
| 6,751,616 | B1 * | 6/2004 | Chan .......................... 707/8 |
| 6,857,012 | B2 * | 2/2005 | Sim et al. ................. 709/222 |
| 7,010,578 | B1 * | 3/2006 | Lewin et al. .............. 709/217 |
| 7,103,645 | B2 * | 9/2006 | Leighton et al. ........... 709/219 |
| 2001/0049741 | A1 | 12/2001 | Skene et al. |

OTHER PUBLICATIONS

"Avenida Web Server 1.1," http://www.avenida.co.uk/products/aws/, pp. 1-3, Jul. 14, 2000.

"Creating a Macintosh CD-ROM (HFS only) with MacImage," http://www.macdisk.com/mimhfsen.php3, pp. 1-3, Jul. 14, 2000.

"eScalability & eAvailability," http://www.vertexsystems.com/includes/Links/eScalability.htm, pp. 1-15, Jul. 14, 2000.

"Foundry Networks Improves Web Server Farm Manageability and Security, and Reduces Infrastructure Costs with Internet Ironware 7.0," http://biz.yahoo.com/bw/000531/ca_foundry.html, pp. 1-3, Jul. 14, 2000.

"Linux Virtual Partition System Project," http://www.feep.net/~roth/code/vps/, p. 1, Jul. 14, 2000.

"Microsoft Security Bulletin (MS00-019): Frequently Asked Questions," http://www.microsoft.com/technet/security/bulletin/fq00-019.asp?a=printable, pp. 1-3, Jul. 19, 2000.

"Site Server Analysis Scalability and Performance," http://www.microsoft.com/technet/commerce/anscale.asp, pp. 1-20, Jul. 14, 2000.

"Webworking: Networking with the Web in Mind," http://www.alteonwebsystems.com/products/white_papers/webworking/index.shtml, pp. 1-9, Jul. 14, 2000.

Abbadi et al., "Availability in Partitioned Replicated Databases," *ACM*, pp. 240-251, 1986.

Adam, "Customizing WWW Sites," *Internet Information Services Administration*, New Riders, pp. 51-67, Jan. 2000.

Adam, "Internetworking Considerations," *Internet Information Services Administration*, New Riders, pp. 11-24, Jan. 2000.

Bloch et al., "A Weighted Voting Algorithm for Replicated Directories," *Journal of the Association for Computing Machinery*, vol. 34, No. 4, pp. 859-909, Oct. 1987.

Braginski et al., "Web Server Configuration," http://www.microsoft.com/technet/iis/runch04.asp?a=printable, pp. 1-30, Jul. 19, 2000.

French et al., "Efficient Searching in Distributed Digital Libraries," *ACM*, pp. 283-284, 1998.

Greenspun, "Tips for Using Oracle," http://www.arsdigita.com/asj/oracle-tips, pp. 1-45, Jul. 18, 2000.

Hackathorn, *Web Farming for the Data Warehouse*, Cerra (ed.), Morgan Kaufmann Publishers, Inc., pp. 65-93, 1999.

Hackathorn, *Web Farming for the Data Warehouse*, Cerra (ed.), Morgan Kaufmann Publishers, Inc., pp. 149-179, 1999.

Harrison, "Oracle8 VLDB Enhancement," http://www.oreview.com/9707hari.htm, pp. 1-7, Jul. 18, 2000.

Herlihy, "Dynamic Quorum Adjustment for Partitioned Data," *ACM Transactions on Database Systems*, vol. 12, No. 2, pp. 170-194, Jun. 1987.

Kumar et al., "Cost and Availability Tradeoffs in Replicated Data Concurrency Control," *ACM Transactions on Database Systems*, vol. 18, No. 1, pp. 102-131, Mar. 1993.

Laurie et al., *Apache The Definitive Guide*, Denn (ed.), O'Reilly & Associates, Inc., pp. 58-68, 1999.

Liu, "Query Routing in Large-Scale Digital Library Systems," http://www.computer.org/proceedings/icde/0071/00710154abs.htm, p. 1, Jul. 27, 2000.

Mohr, *Designing Distributed Applications*, Wrok Press, pp. 51-85, 1999.

Mueller et al., "User Account and File System Administration," *Microsoft Internet Information Server 4: The Complete Reference*, McGraw-Hill, pp. 255, 281-290, 1998.

Mueller et al., "Virtual Directories and Virtual Servers," *Microsoft Internet Information Server 4: The Complete Reference*, McGraw-Hill, pp. 305-325, 1998.

Salzberg, "Access Methods," *The Computer Science Engineering Handbook*, Tucker (ed.), CRC Press, Inc., pp. 1012-1037, 1997.

Shasha, "Tuning Database Design for High Performance," *The Computer Science Engineering Handbook*, Tucker (ed.), CRC Press, Inc., pp. 995-1011, 1997.

Skonnard, "The XML Files," http://msdn.microsoft.com/msdnmag/issues/0300/XML/XML.asp, pp. 1-7, Jul. 14, 2000.

Wu et al., "A Buffer Allocation Scheme for ATM Networks: Complete Sharing Based on Virtual Partition," *IEEE/ACM Transactions on Networking*, vol. 3, No. 6, pp. 660-670, Dec. 1995.

Yager, "'69%'> From Apache to IIS, Part II," http://www.unixreview.com/archives/articles/1999/january/9901int.shtml, pp. 1-5, Jul. 20, 2000.

* cited by examiner

FIG. 14

```
HRESULT ResourceManager::GetResource ( . . . ) {
 return m_rgVirtual Partitions[dwResType][Hash (pvKey)] ->
    GetResource( . . . );
```

FIG. 15A

```
HRESULT GetResource(
    DWORD   dwResType,      //Type of resource requested
    PVOID   pvKey,          //Pointer to partition key
    DWORD   dwKeyType,      //Key type: sz, wsz, dword,
                            //PassportID, GUID, etc.
    DWORD   *pdwFlags,      //Flags (for use with
                            // resource component)
    REFIID  riid,           //GUID of interface to return
    IUnknown **ppI);        //Returned interface pointer
```

FIG. 15B

```
DWORD Hash(PSTR szKey) {
    DWORD dwRet = -;
    DWORD dwIndex = 0;

while (szKey[dwIndex] != '\0') {
        dwRet <<=1;
        dwRet += rgbCharVal [szKey] [dwIndex];
        dwIndex++;
    } return dwRet % NUM_VIRT_PARTITIONS;
}
```

FIG. 16

```
class IRMPhoto: public IRMResource
{

// Called when component is loaded.
    //  Allows the component to load
    //  resource specific information
HRESULT Init(
        wszSrvInfo,    // [in] Server configuration information
        dwResID,       // [in] Id of this resource type
        dwSrvId        // [in] Id of this server
            {
        ...
        // parse the wszSrvInfo string to determine which
        // database to use for this instance, etc.
        this -> PhotoInit(wszSrvInfo);
        ...
}

// Definition of GetResource follows here . . .
```

FIG. 17

```
// Called by GetCommResource to get the resource session
// component. If resource requires an interface with state
// can be implemented to grab an object from a pool.
// Otherwise can just return a copy to itself.

// if the bucket is under write lock, then the resource
// manager adds the rm_flag_write_lock flag to
// the flags (input and output)

HRESULT GetResource(
    DWORD   dwResType,    //Type of resource requested
    PVOID   pvKey,        //Pointer to partition key
    DWORD   dwKeyType,    //Key type: sz, wsz, dword,
                          //PassportID, GUID, etc.
    DWORD   *pdwFlags,        //Flags (for use with
                          //   resource component)
    REFIID  riid,         //GUID of interface to return
    IUnknown **ppl);      //Returned interface pointer
}
```

FIG. 18

```
Interface IRMPhoto : public IUnknown
{

...

// Note that the functions in this object operate without
    // information about (are effectively unaware of) which
    // physical store on which the data resides.
    // The session resource component was pulled from a
    //  resource component encapsulating the location HRESULT    AddPhoto( ... );
    HRESULT    DelPhoto( ... );
    HRESULT    ViewPhoto( ... );

```
HRESULT ViewPhoto (LPSTR szCommunity, DWORD
dwPhotoID, PHOTOSTRUCT *pPhoto)
{
    ...
    IRMPhoto pPhoto = NULL;
    // get the resource which abstracts the appropriate
    // location for this key hr = GetResource(
            PHOTO,          //Type of resource requested.
            szCommunity,    // Here we partition on
                            // community name
            STRING,         // how to interpret the key
            NULL,           // Flags - not used in this case
            IID_RMPHOTO     // GUID of interface to return
            &pPhoto         // The session object
         );

if (SUCCEEDED ( hr ) ){
        hr = pPhoto->ViewPhoto ( . . . );
            // do query, populate the struct
        pPhoto->Release();
    }

```
// Operations interface for Resource Administrator and
// Resource Administrator Client interface IRMResourceOps : public IRMResource
{

// Validate configuration
        HRESULT Validate();
        // Can be extended to provide message output //Move bucket implementation
        HRESULT MoveBucket(DWORD dwBucketNum,
                                        IRMResource *pIResDest);
};
```

FIG. 21

```
// Running
const RM_RES_STATUS_OK = 0;
// Temporarily offline
const RM_RES_STATUS_OFFLINE = 1;
// Permanently offline, may be reclaimed later with a new configuration
const RM_RES_STATUS_OUTOFSERVICE = 2;

typedef struct
{
DWORD dwResTypeID;
    CLSID clsid;
    LPWSTR wszDLL;
} RMResourceType;

typedef struct
{
    LPWSTR wszSrvInfo;
    DWORD dwStatus;
} RMResource;

typedef struct
{
    DWORD dwResID;
    BOOL fWriteLock;
} RMBucket;
```

FIG. 22

```
interface IRMAdmin : IUnknown
{
        // Load the list of resource types
HRESULT LoadTypes(
            RMResourceType **prgResType,    // [out]
            DWORD *pcTypes);                // [out]

// Load the list of resources for a given resource type
        HRESULT LoadResources(
            DWORD dwResType,                // [in]
            RMResource **prgResources,      // [out]
            DWORD* pcResources);            // [out]

// Load the bucket mappings for a given type
        HRESULT LoadBuckets(
            DWORD dwResType,                // [in]
            RMBucket** rgBuckets,           // [out]
            DWORD* pcBuckets);              // [out]
};
```

FIG. 23

```
interface IRMAdminOps : IRMAdmin
{
// Change the status of a resource
    HRESULT UpdateStatus(
        DWORD dwResType,              // [in]
        DWORD dwResId,                // [in]
        DWORD dwStatus                // [in]
        );

// Change the configuration of a resource
HRESULT SetSrvInfo(
    DWORD dwResType,                  // [in]
    DWORD dwResId,                    // [in]
    LPWSTR wszSrvInfo);               // [in]

// Attempt to get the write lock for a given bucket.
HRESULT GetBucketWriteLock (
    DWORD dwResType,                  // [in]
    DWORD dwBucketId,                 // [in]
    DWORD *pdwLockId);                // [out]
```

FIG. 24

```
// Attempt to release the write lock for a given bucket.
HRESULT ReleaseBucketWriteLock (
    DWORD dwResType,                // [in]
    DWORD dwBucketId,               // [in]
    DWORD dwLockId);                // [in]

// Set a bucket as having been moved.  Called after coping
// the data to the new location, but before deleting the
// data from the old location.
HRESULT MoveBucket(
    DWORD dwResType,                // [in]
    DWORD dwBucketId,               // [in]
    DWORD dwDestResId);             // [in]

// Add a new resource type
HRESULT AddResourceType(
    DWORD dwResType,                // [in]
    RMResource *rgResources,        // [in]
    DWORD *pcResouces,              // [in]
    RMBucket *rgBuckets,            // [in]
    DWORD *pcBuckets);              // [in]

// Add a new resouce
HRESULT AddResource(
    RMResource *pResource,          // [in]
    DWORD *pdwResId);               // [in]

}; //IRMAdminOps
```

FIG. 25

```
interface IRMAdminClient : IUnknown
{
    // The methods Reset and Commit allow the interface
    // application to maintain a state and perform more
    // complex operations like adding
    // several resources and migrating the buckets
    // among them.

// Reset: causes the current state and queued
    //         operations to be reset.
    // The interface application calls it before starting
    //  sending a new batch of operations
    HRESULT Reset();

// Commit: starts processing the operations queued
    HRESULT Commit();
```

FIG. 26

```
// QueryQueuedOperations: returns the current
// queued operations
HRESULT QueryQueuedOperations(
    [out, size_is(, *pdwCount)]
        RM_CLIENT_OPERATION** ppOperations,
            // Pointer that receives a pointer to an
            // array of RM_CLIENT_OPERATION with
            // *pdwCount items
    [out] LPDWORD pdwCount);
            // The number of
            // RM_CLIENT_OPERATION items
            // returned
// CancelOperation: cancels one specific operation
HRESULT CancelOperation(
    [in] DWORD dwOperationId);   // Get this from
                                 // RM_CLIENT_OPERATION
```

FIG. 27

```
// AddResourceType: the interface application passes
// the CLSID of the resource component to be installed
// and the worker extracts the remaining information
// it needs by querying IRMResourceOps from it and
// calling GetResourceComponentInfo
HRESULT AddResourceType(
    [in] REFIID riid,   // Ref to the CLSID of the
                        // component
    [out] LPDWORD pdwResTypeId);
                // The id attributed to the Resource Type
                // This id is unique for each resource type
                // and is obtained by
                // GetResourceComponentInfo // RemoveResourceType: called by the interface
// application do delete a resource type. This causes the
// deletion of all the resources and buckets related to
// this type. The interface application can use either of
// the 2 parameters
HRESULT RemoverResourceType(
    [in] REFIID riid,
            // Ref to the CLSID of the component
    [in] LPDWORD pdwResTypeId);
            // Id of the resource type
```

FIG. 28

```
// AddResource: adds a new resource of a specific type.
// During the commit, the worker will add all the queued
// resources and then it will migrate buckets to them.
HRESULT AddResource(
        [in] DWORD dwResTypeId,
                // The type id of the new resource
        [in] LPCWSTR wszInitInfo,
                // The Server Init string (each resource
                // type has its own parameter requirement)
        [out] DWORD pdwResId);
                // Returned Resource Id // ChangeResourceInitInfo: changes the InitInfo of a resource.
// This can be useful to redirect resources to their backups in
// case of failures.
HRESULT ChangeResourceInitInfo(
        [in] DWORD dwResTypeId,
                                        // The TypeId of the resource
        [in] DWORD dwResId,             // The id of the resources
        [in] LPCWSTR wszInitInfo        // The new init. info.
);
```

FIG. 29

```
// ChangeResourceStatus: changes a resource's status.
// Possible status include RM_RES_STATUS_OK,
// RM_RES_STATUS_OFFLINE,
// RM_RES_STATUS_OUTOFSERVICE HRESULT ChangeResourceStatus(
    [in] DWORD dwResTypeId,
                    // The TypeId of the resource
    [in] DWORD dwResId,    // The id of the resources
    [in] DWORD dwStatus);      // The new status // DeleteResource: deletes the resource. This causes the
// deletion of buckets related to this resource
HRESULT DeleteResource(
    [in] DWORD dwResTypeId,
                    // The TypeId of the resource
    [in] DWORD dwResId);        // The id of the resource // MigrateBuckets: migrates a number of buckets from one
// resource to another.
HRESULT MigrateBuckets(
    [in] DWORD dwResTypeId,
                    // The TypeId of the resources
    [in] DWORD dwSourceResId, // the id of the source
    [in] DWORD dwDestResId, // the id of the destination
    [in] DWORD dwBucketCount);
                    // the number of buckets to be moved
}; // IRMAdminClient
```

SCALABLE VIRTUAL PARTITIONING OF RESOURCES

RELATED APPLICATION DATA

This application is a divisional of U.S. patent application Ser. No. 09/632,382, filed Aug. 3, 2000, which is hereby incorporated herein by reference.

TECHNICAL FIELD

The technical field relates to partitioning resources provided to a set of client computers accessing the resources via a network.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The tremendous popularity of the World Wide Web has presented a number of challenges to web site administrators. As the number of computer users having access to web browsers increases, web site administrators constantly work to improve the efficiency of their web sites in the face of explosive growth in both the number of users visiting their site and the sheer quantity of information being provided. Many web site administrators have discovered that a single web server computer can not perform the tasks necessary to receive and fulfill requests from users browsing their site, no matter how well the web server computer is optimized.

One way web site administrators address the challenges presented by massive numbers of browsing users is by placing content on a computer separate from the web server by using a facility called "virtual directories." The virtual directory feature is supported by MICROSOFT Internet Information Server (IIS), a product available from Microsoft Corporation of Redmond, Wash. One aspect of a virtual directory allows a web site administrator to redirect requests for information (e.g., web pages in "http://a.b.com/products/") to a server separate from the web server. The web site administrator configures such a system by creating a virtual directory and specifying the location from which the information is to be drawn for the virtual directory.

The web site administrator can then deploy several web servers on several machines, all drawing content from a content server running on yet another machine. Requests for information can be divided among the several web servers via a routing mechanism. In this way, the web servers can be optimized to field requests for content, and the content server can be optimized to serve content. The content server need not provide full web server functionality, and its computing resources can be devoted to serving content, leading to greater availability of the data.

Still, however, the content is being drawn from a single content server. As the amount of data increases, the single content server becomes overwhelmed. Web site administrators have responded by creating multiple virtual directories and pointing them to multiple different servers. The administrator can then scatter the site's web pages over multiple content servers by placing them in different virtual directories. When a request for a web page comes in to the web site, the software fielding the request at a web server maps the requested page's location (e.g., "products") to virtual directory information, which specifies on which content server the content resides. Web site administrators thus attempt to avoid overload of any single machine by directing only a percentage of the incoming requests for web pages to any one content server.

SUMMARY

The described approach of using multiple content servers in conjunction with virtual directories suffers from some drawbacks. First, dividing the content into virtual directories can sometimes result in an artificial division of content that is exposed to the browsing user. Typically, the web site administrator is forced to design the virtual directory structure in anticipation of how much load will be handled by a server. For example, in a system where new users are assigned space for storing information on the web site, the web site administrator might create three virtual directories ("server1/" "server2/", and "server3/) and assign users with log on names starting with the letters "A-H" to server1/, users with log on names "I-P" to server2/, and users with log on names "Q-Z" to server3/.

Users browsing the site will see the virtual directory (e.g., http://www.a.b.com/server3/smith/) when browsing the site. However, the fact that the content resides on server3 is unimportant to the browsing user, and including the virtual directory information results in awkward, lengthy references to web pages.

Further, the web site may grow, and the virtual directory feature presents problems when the web site administrator wishes to add an additional content server. For example, she might wish to divide an existing virtual directory (e.g. "server2/") into two separate virtual directories (e.g., "server2/" and "server4/") to direct some requests for information to the additional content server.

To add the additional content server and a new virtual directory, current information from the old virtual directory must be copied. However, if the web site is active, additional changes might be made to the directory by browsing users during the copy process. So, the copied information is no longer current. Thus, copying leads to a synchronization problem.

To solve the synchronization problem, the web site administrator may shut down the virtual directory while changes are being made. However, such an approach has the undesirable side effect of disrupting service for a large number of users. Typically, the virtual directory is being divided because it is popular, so shutting it down involves shutting down one of the site's more popular areas. And, if the directory contains a large volume of information, the copy process may take some time. Thus, a popular area of the web site is unavailable for an extended period.

Further, modifying the virtual directory information is not a simple process. Typically, the virtual directory information is stored locally at each of the web servers. Thus, the web site administrator must change the information at each of the servers. As the number of servers grows, such a task can be prohibitively time-consuming.

Further, even if the virtual directory facility is used, it is still possible that a single virtual directory cannot be easily divided. If such a virtual directory is being overwhelmed with requests, the web site administrator is left with no mechanism to efficiently divide the content among separate content servers. Thus, there is a need for a more effective way to divide content among separate content servers.

The invention includes methods and systems relating to various ways of addressing the issues surrounding scenarios involving partitioning resources among multiple servers. For example, a virtual partition system can be designed to determine a partition value algorithmically. Thus, each of the web servers can determine on which partition a resource resides without reference to a central map. Once the partition value is determined, it can then be mapped to a resource component, which provides access to a resource server, regardless of the resource server's technology or the type of resource provided.

Since the partition value can be determined algorithmically, the underlying structure of the partition system need not be exposed to the browsing user. Instead, the resources can be partitioned based on a key (e.g., user name or subject) associated with the resource.

The virtual partitions can be arbitrarily mapped among a number of servers serving the resources. For example, all the virtual partitions might be assigned to a single server, or each virtual partition might be assigned to a different server. The system can thus scale from a single server to many servers.

A set of resource managers can field resource requests at a plurality of web servers and use the virtual partition system in tandem with reference to a local map indicating partition mapping. Although a resource administrator feature is provided to manage the partition mapping across the resource managers, the virtual partition system continues to function even if the resource administrator feature becomes unavailable.

In another feature, the virtual partition system supports repartitioning while allowing access to the resources. Repartitioning can be used to add a new resource server to the web site with minimal impact on browsing users. If there are a large number of possible virtual partition values, only a very small percentage of the resources is locked during repartitioning. Further, the resources can still be read during repartitioning, avoiding disruption to the web site. Resources can be further partitioned by resource type to provide the web site administrator with an additional way to partition the resources. Repartitioning can be accomplished via a single directive by a user, rather than a directive at each machine.

The virtual partition system can employ resource components having a standard set of invokable functions. The functions are suitable for use with a wide variety of resource servers, regardless of the type of resource. For example, a resource server developer can assemble a resource component suitable for providing access to a certain type of resource as long as it makes the standard set of functions available. The resource component may handle resource access itself or serve another component if, for example, state information is to be maintained during access to a resource.

The resource administrator feature also allows an administrating user to alter configuration information used at the resource managers. In this way, the system allows convenient configuration changes across of a large number of servers at once.

Additional features and advantages of the invention will be made apparent from the following detailed description of illustrated embodiments, which proceeds with reference to the accompanying drawings.

BRIEF DESCRIPTION OF THE DRAWINGS

FIG. 14 is a code listing of logic for providing access to a resource via the virtual partition table shown in FIG. 13B.

FIG. 15A is a code listing illustrating a function provided by a resource manager.

FIG. 15B is a code listing illustrating a hashing function performed on a partition key to obtain a virtual partition value.

FIGS. 16-17 are code listings showing a standard interface to a photo album resource component.

FIG. 18 is a code listing showing a photo object, such as one provided via the standard interface of FIGS. 16-17.

FIG. 19 is a code listing showing an example of using resource components to view a photo.

FIG. 20 is a code listing of an interface supported by resource components in an illustrated architecture.

FIG. 21 is a code listing of data structures for use with a resource administrator.

FIG. 22 is a code listing of an interface provided by a resource administrator for use by a resource manager.

FIGS. 23-24 are code listings of an interface provided by a resource administrator for use by a resource administrator client.

FIGS. 25, 26, 27, 28, and 29 are code listings of a set of functions provided by a resource administrator client.

DETAILED DESCRIPTION

The invention is directed to methods and systems related to providing access to resources via multiple resource servers. In one embodiment illustrated herein, the invention is used in conjunction with MICROSOFT Internet Information Service, marketed by Microsoft Corporation of Redmond, Wash.

Briefly described, the Internet Information Service software is a versatile service suitable for use in a wide variety of web site scenarios.

Definitions

The term instantiate includes both creating a programming component of a particular class and obtaining a programming component from a pool of programming components already created.

The term resource server includes a single computer server or a cluster of servers serving resources. Such servers include data servers (e.g., file servers and database servers), application servers, and the like.

Exemplary Operating Environment

Figure 1:
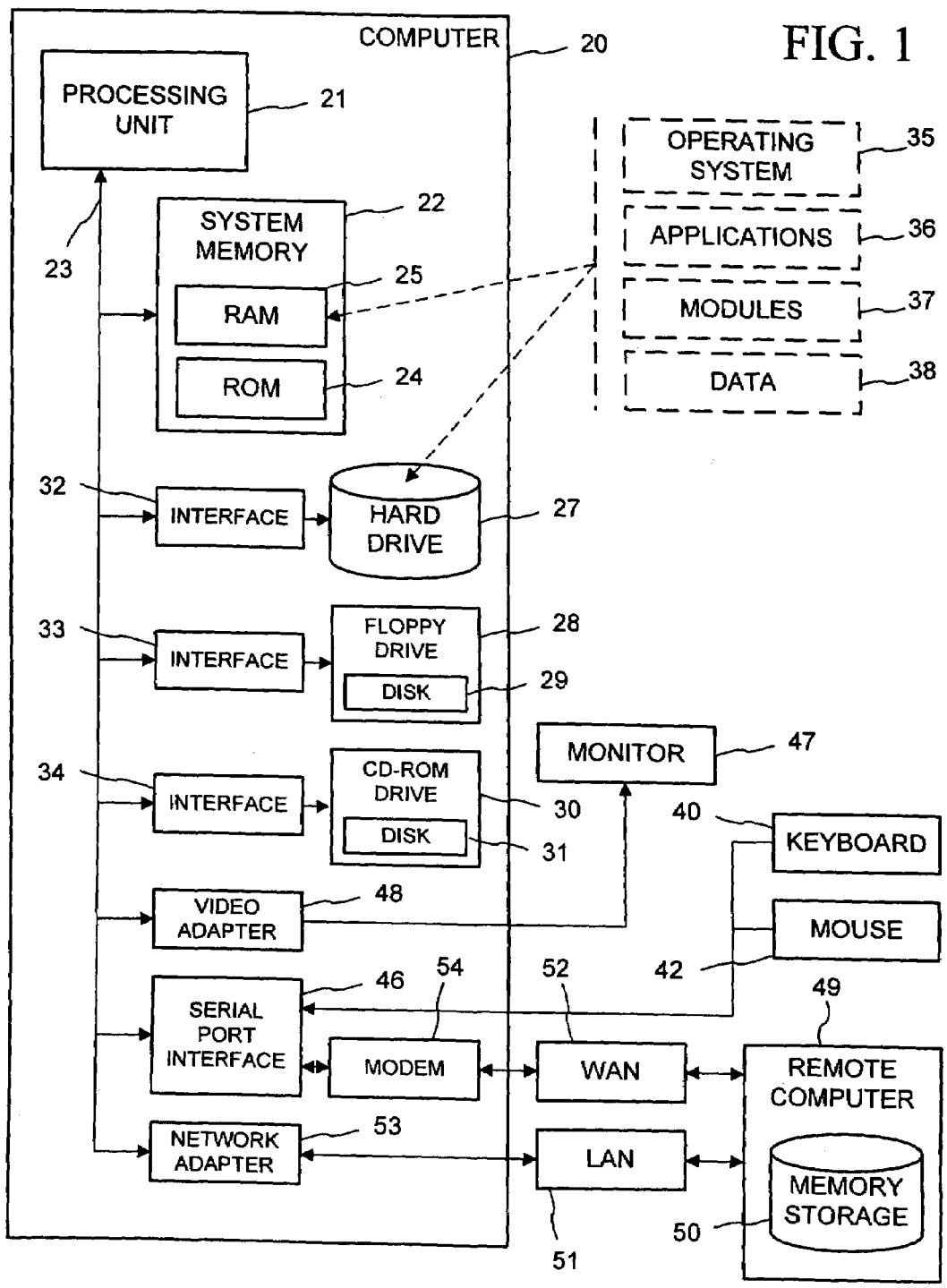
FIG. 1 is a block diagram of a computer system that may be used to implement the described optimization system.

FIG. 1 and the following discussion are intended to provide a brief, general description of a suitable computing environment in which the invention may be implemented. While the invention will be described in the general context of computer-executable instructions of a computer program that runs on a computer, the invention also may be implemented in combination with other programs. Generally, programs include routines, software objects (also called components), data structures, etc. that perform particular tasks or implement particular abstract data types. Moreover, the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structures including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of programs may be stored in the drives and RAM 25, including an operating system 35, one or more application programs 36, other programs 37, and program data 38. The operating system 35 in the illustrated computer may be the MICROSOFT WINDOWS NT Server operating system, together with the before mentioned MICROSOFT Transaction Server.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote client computer 49. The remote computer 49 may be a workstation, a terminal computer, another server computer, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, extranets, and the Internet.

When used in a LAN networking environment, the computer 20 is connected to the local network 51 through a network interface or adapter 53. When used in a WAN networking environment, the computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the following: manipulation by the processing unit 21 of electrical signals representing data bits, which causes a resulting transformation or reduction of the electrical signal representation; the maintenance of data bits at memory locations in the memory system (including the system memory 22, hard drive 27, floppy disks 29, and CD-ROM 31) to thereby reconfigure or otherwise alter the computer system's operation; as well as other processing of signals. The memory locations where data bits are maintained are physical locations that have particular electrical, magnetic, or optical properties corresponding to the data bits.

Programming Component Overview

Figure 2:
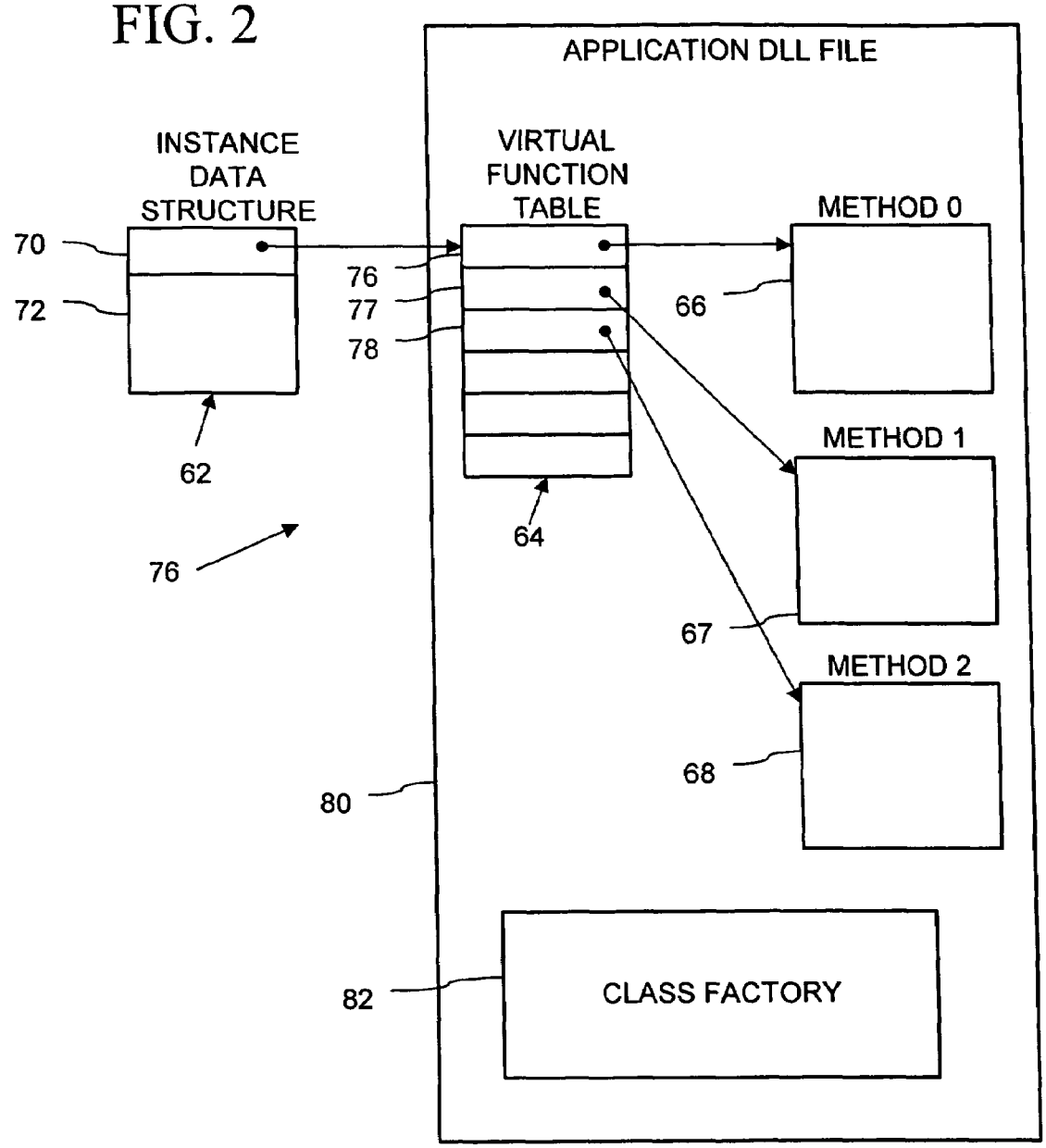
FIG. 2 is a block diagram of an object conforming to the Component Object Model specification of Microsoft Corporation, which may be used for implementing programming components associated with the invention.

FIG. 2 and the following discussion are intended to provide an overview of programming components, using the MICROSOFT Component Object Model (COM) as an exemplary model for programming components. In the illustrated embodiments, a software management framework is implemented in the MICROSOFT COM Environment. COM is a model for accommodating programming components and can be implemented on a variety of platforms, such as the MICROSOFT WINDOWS NT operating system. In the illustrated embodiments of the invention, the programming components conform to the MICROSOFT Component Object Model ("COM") specification (i.e., are implemented as a "COM Object" 76) and are executed using the COM services of the MICROSOFT WINDOWS 2000 operating system, but alternatively may be implemented according to other object standards (including the CORBA (Common Object Request Broker Architecture) specification of the Object Management Group and JAVABEANS by Sun Microsystems) and executed under object services of another operating system. The COM specification defines binary standards for programming components and their interfaces which facilitate the integration of programming components into programs. (For a detailed discussion of COM and OLE, see Kraig Brockschmidt, *Inside OLE, Second Edition*, Microsoft Press, Redmond, Wash. (1995)).

In accordance with COM, the COM object 60 is represented in the computer system 20 (FIG. 1) by an instance data structure 62, a virtual function table 64, and member methods (also called member functions) 66-68. The instance data structure 62 contains a pointer 70 to the virtual function table 64 and data 72 (also referred to as data members or properties of the programming component). A pointer is a data value that holds a reference to an item. As will be explained in greater detail below, the conventional instance data structure 70 is modified to accommodate grouping the data members into separate groups. The virtual function table 64 contains entries 76-78 for the member methods 66-68. Each of the entries 76-78 contains a reference to the code 66-68 that implements the corresponding member methods.

The pointer 70, the virtual function table 64, and the member methods 66-68 implement an interface of the COM object 60. By convention, the interfaces of a COM object are illustrated graphically as a plug-in jack as shown for the programming components 422 in FIG. 4. Also, interfaces conventionally are given names beginning with a capital "I." In accordance with COM, the COM object 60 can include multiple interfaces, which are implemented with one or more virtual function tables. The member function of an interface is denoted as "IInterfaceName::MethodName." Other systems can use a similar approach, even though the grouped methods are not called an interface.

The virtual function table 64 and member methods 66-68 of the COM object 60 are provided by a programming component server program 80 (hereafter "object server DLL") which is stored in the computer 20 (FIG. 1) as a dynamic link library file (denoted with a ".dll" file name extension). In accordance with COM, the object server DLL 80 includes code for the virtual function table 64 and member methods 66-68 of the classes that it supports, and also includes a class factory 82 that generates the instance data structure 62 for a programming component of the class. In some cases, a COM object can be implemented without a virtual function table.

Other programming components and programs (referred to as a "client" of the COM object 60) access the functionality of the COM object by invoking the member methods through the COM object's interfaces. Typically, however, the COM object is first instantiated (i.e., by causing the class factory to create the instance data structure 62 of the programming component); and the client obtains an interface pointer to the COM object.

Before the COM object 60 can be instantiated, the programming component is first installed on the computer 20. Typically, installation involves installing a group of related programming components called a package. The COM object 60 is installed by storing the object server DLL file(s) 80 that provides the programming component in data storage accessible by the computer 20 (typically the hard drive 27, shown in FIG. 1), and registering COM attributes (e.g., class identifier, path and name of the object server DLL file 80, etc.) of the COM object in one or more data stores storing configuration information. Configuration data stores for the programming component include a registry and a catalog.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM library, which is a component of the MICROSOFT WINDOWS 2000 operating system in a file named "OLE32.DLL." Other versions of COM or other programming components services may use another file or another mechanism. Also in COM, classes of COM objects are uniquely associated with class identifiers ("CLSIDs") and registered by their CLSID in the registry (or the catalog, or both). The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM service named "CoCreateGUID" (or any of several other APIs and utilities that are used to create universally unique identifiers) and assigns to the respective classes. The interfaces of a component additionally are associated with interface identifiers ("IIDs").

In particular, the COM library provides an API function, "CoCreateInstance( )," that the client program can call to request creation of a component using its assigned CLSID and an IID of a desired interface. In response, the "CoCreateInstance( )" API looks up the registry entry of the requested CLSID in the registry to identify the executable file for the class. The "CoCreateInstance( )" API function then loads the class' executable file and uses the class factory in the executable file to create an instance of the COM object 60. Finally, the "CoCreateInstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 60 in the system registry.

Once the client of the COM object 60 has obtained this first interface pointer of the COM object, the client can obtain pointers of other desired interfaces of the component using the interface identifier associated with the desired interface. COM defines several standard interfaces generally supported by COM objects including the "IUnknown" interface. This interface includes a member function named "QueryInterface( )." The "QueryInterface( )" function can be called with an interface identifier as an argument, and returns a pointer to the interface associated with that interface identifier. The "IUnknown" interface of each COM object also includes member functions, "AddRef( )" and "Release( )", for maintaining a count of client programs holding a reference (e.g., an interface pointer) to the COM object. By convention, the "IUnknown" interface's member functions are included as part of each interface on a COM object. Thus, any interface pointer that the client obtains to an interface of the COM object 60 can be used to call the QueryInterface function.

Web Farm Overview

Figure 3:
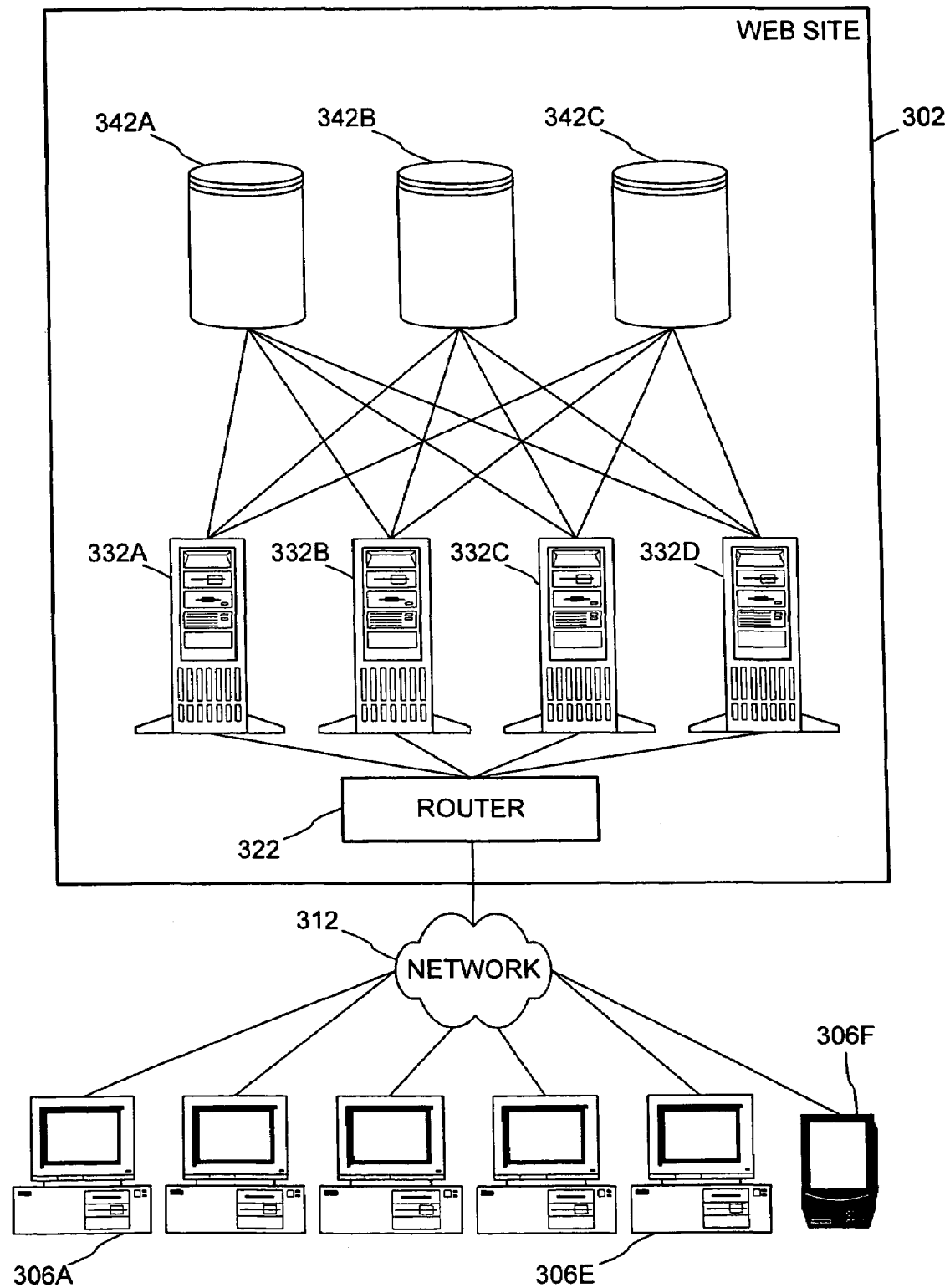
FIG. 3 is a block diagram showing an environment suitable for hosting a web site.

FIG. 3 shows an environment suitable for hosting a web site 302. Because the number of web servers 332A-332D hosting a web site has grown to be many rows of machines, web site administrators have begun to refer to such an environment as a "web farm."

The web site 302 can accommodate a large number of browsing computers 306A-306F having access to a network 312. The browsing computers 306A-306F can be of any variety of hardware, including a hand held device 306F. Typically, requests from the browsing computers 306A-306F are received at a router 322, which in turn relays the requests to the web servers 332A-332D.

While processing requests by the browsing computers 306A-306F, the web servers 332A-332D have access to resource collections 342A-342C. The resource collections 342A-342C can be, for example, databases or sets of files. Each resource collection 342A is referred to generally as a resource server. However, in practice, the resource server may be a cluster of servers, including a router (not shown), which routes requests for information among the servers in the cluster. In some cases, multiple resource servers can reside on a single server or cluster of servers.

Although the example shows six browsing computers, four web servers, and three resource servers, the number of computers in an actual system will differ and typically greatly exceeds those shown in the example.

System Architecture Overview

Figure 4:
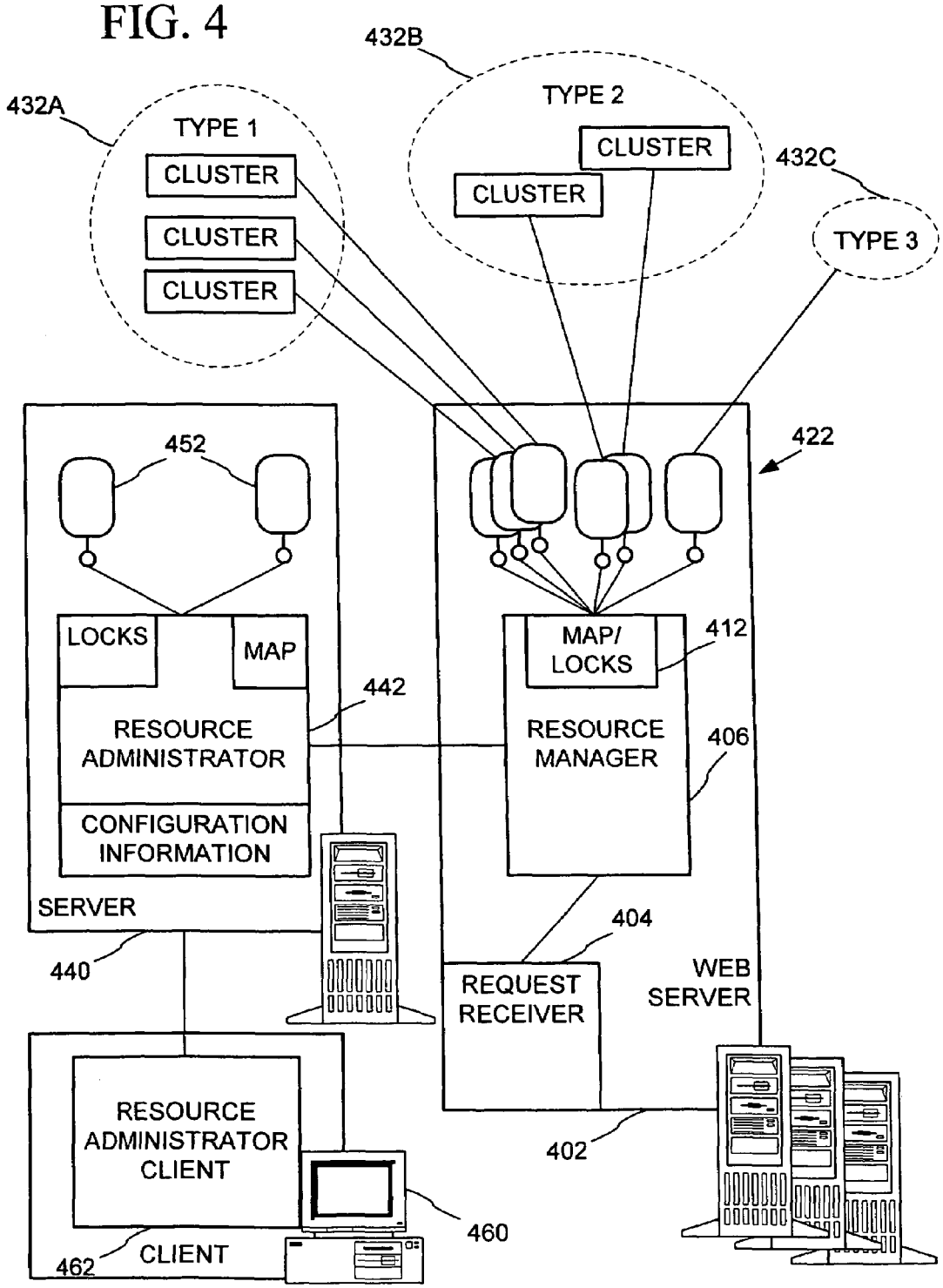
FIG. 4 is a high-level block diagram showing an overview of an exemplary web site using features of the invention.

An overview of a web site's system architecture incorporating features of the invention is shown in FIG. 4. One of the web servers 402 executes logic for a request receiver 404, which receives requests directed by browsing computers. The request receiver 404 has access to a resource manager 406, which utilizes a map/locks structure 412 to direct requests for resources to the resource components 422. The resource components 422 in turn direct the requests to the resource servers 432A-432C, which can be segregated according to resource type.

Because logic in the resource components 422 can handle the details related to finding and interacting with the resource servers 432A-432C, logic for the resource manager need not address idiosyncrasies related to particular resource types. The resource components 422 can be designed to encapsulate information for connecting to the resource servers 432A-432C and manipulating a resource thereon. Thus, new resource types can be added by adding a new resource component without reengineering the architecture, and programs requesting a resource are shielded from the details (e.g., where the resource resides) concerning how to access the resource.

A server computer 440 executes a resource administrator 442 for administrating the resource managers on the web servers (e.g., resource manager 406 on web server 402). The resource administrator 442 can include configuration information for assisting in linking the resource components 422 to the resource servers 432A-432C, a master copy of a map for distribution to the resource managers (e.g., 406), and locks for synchronizing changes made to the map.

Further, the resource administrator 442 may access resource components 452 to perform operations on the resource servers 432A-432C, for example during repartitioning operations.

A client computer 460 executes a resource administrator client 462, which presents a user interface for interacting with the resource administrator 442. For example, a web site administrator may change the configuration information or perform repartitioning operations via a user interface presented by the resource administrator client 462, which then directs appropriate directives to the resource administrator 442.

Although the various elements of the web site are shown on different computers, it is possible that elements reside on the same computer. For example, the resource administrator 442 may reside on the same computer as the resource administrator client 462. Further, two elements can sometimes be implemented as a single element.

Although FIG. 4 shows the invention in an arrangement involving a web server, the services provided by the invention can be used by another system (sometimes called a "consumer" of the resources). For example, the invention can be implemented in a mail server, FTP server, or any system managing a set of partitioned resources.

Distributed Resource Managers Overview

Figure 5:
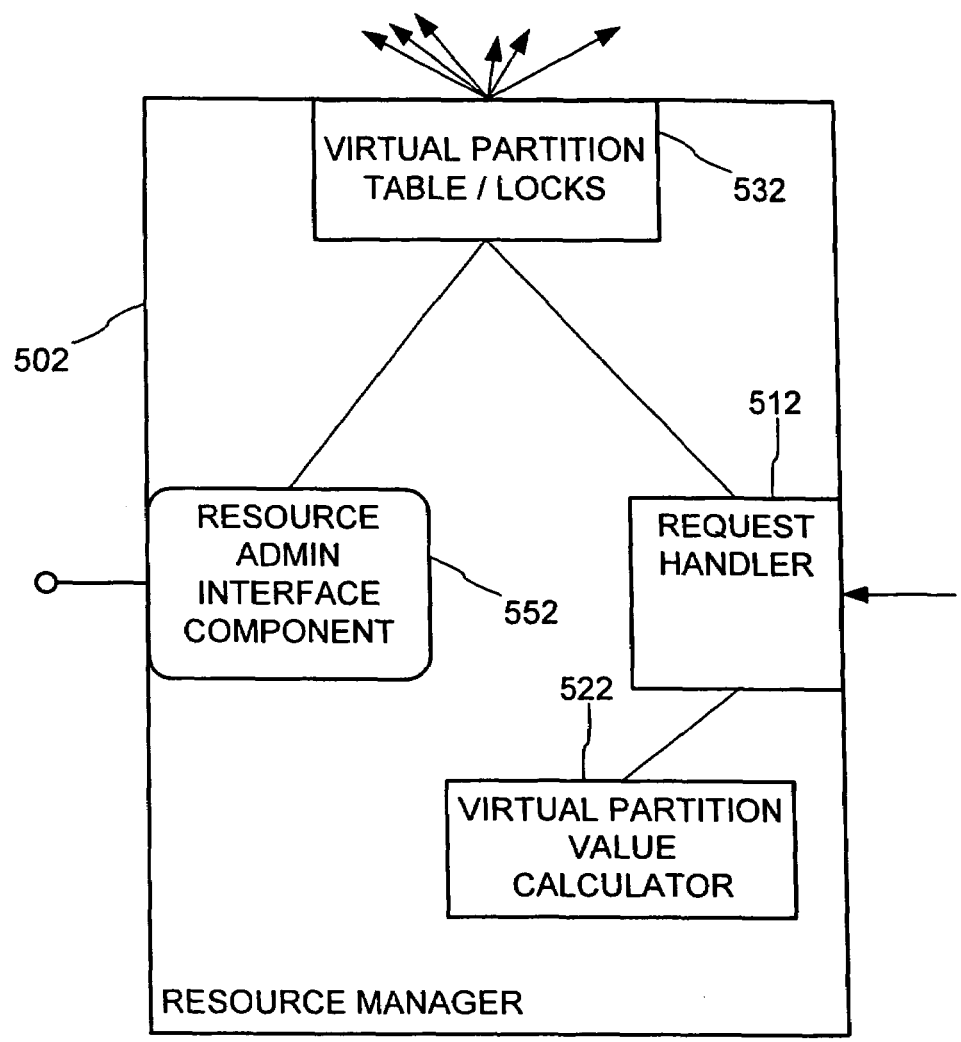
FIG. 5 is a block diagram showing an overview of an exemplary resource manager.
Figure 6A:
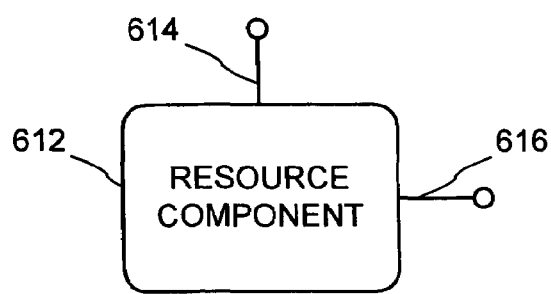
FIGS. 6A-6D are block diagrams showing exemplary resource components for dealing with resources.
Figure 6B:
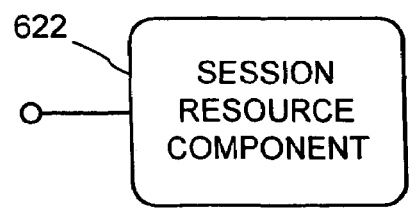
Figure 6C:
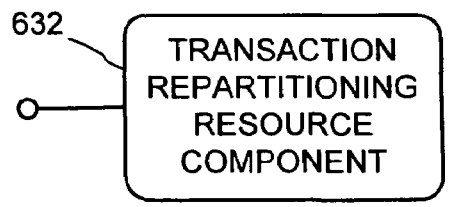
Figure 6D:
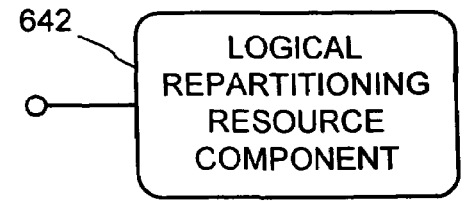

An example of a resource manager 502 is shown in FIG. 5. Typically, a set of resource managers is distributed about a number of web servers, each of which can field requests for information from browsing computers.

In the example, the resource manager includes a request handler 512, to which requests for a resource can be relayed. A virtual partition value calculator 522 calculates a virtual partition value based on the request using an algorithmically-based calculation. Typically, the calculation is effectively a reductive mapping. For example, a hash function might be performed on an identifier associated with a requested resource. The identifier is sometimes called a "key," although it need not be unique to the resource. Such a key might be a user name, a user identifier, a subject name, a virtual location name, a date, a number, a string, or other data.

The request handler 512 can direct a request for a resource to a resource component (not shown) by mapping the value provided by the virtual partition value calculator 522 to a reference referring to a resource component via a virtual partition table 532. The resource component encapsulates information for accessing the particular resource server on which the resource resides. The location of the resource is thus determined, at least in part, by the key.

The virtual partition table 532 might also include a locking mechanism to allow portions of the table (or the entire table) to be locked when the table is modified. For example, if resources on resource servers are repartitioned, the table might indicate that writes are not permitted to resources about to be relocated during repartitioning. Or, resources might be temporarily made unavailable while a malfunctioning server is replaced. Although the virtual partition table and locks can be implemented as a single data structure, they also can be implemented separately, or some other mechanism can be used for locking.

The resource administrator interface component 552 provides a mechanism for communicating with a resource administrator. Typically, a two-way communication link is set up between a resource manager 502 and a resource administrator to allow exchange of directives and messages. For example, when the resource manager is first started, it can retrieve information for building the virtual partition table from the resource administrator. The resource administrator can also provide the information used by the resource components to access the resource servers. Further, configuration changes and repartitioning directives can be received via the administrator interface component 552.

Although there may be many resource managers 502 for a single system, they can each receive information from the resource administrator. Thus, configuration changes (e.g., changes in the way connections are made to the resource servers) across the resource managers can be accomplished by performing a single operation at the resource administrator, which propagates the changes to the resource managers.

Resource Server Overview

The resource servers 432A-432C (FIG. 4) can serve a wide variety of resources. For example, the resources might include graphics files or user profiles in the form of files. In such a case, a file system provides an identifier for retrieving the resource.

However, the resources can take forms other than files. For example, a database server can serve as a resource server and accept queries to provide a wide variety of resource types. For example, text, XML, HTML, or BLOBs could be provided by a database server. Resource components can encapsulate information that provides details for accessing the resource server (e.g., a name and password). The logic in the resource manager and resource administrator thus operates without regard for the details required to handle a particular resource type and is sometimes called "resource type agnostic." So, if a new type of resource or resource server becomes available, it can be easily incorporated into the architecture by adding a new class of resource component without modifying the resource manager or resource administrator design.

Resource Components Overview

Examples of resource components 612, 622, 632, and 642 are shown in FIGS. 6A, 6B, 6C, and 6D. One type of resource component 612 includes a standard interface 614 for receiving requests from the resource manager for a reference (e.g., and interface) to a component operable to fulfill requests for a resource. The component operable to fulfill the request is sometimes called a "session component." Since the resource component provides references to components, it is sometimes called a "component server." In some cases, the resource component 612 may have an additional custom interface 616 for supporting operations not supported by the standard interface 614. Further, the resource component, when receiving a request via the standard interface 614, may return a reference to itself (e.g., the custom interface 616). The resource component 612 can be designed to support another interface (not shown) for accomplishing repartitioning operations.

In some cases, it may be necessary to maintain state information as a resource is provided. In such a case, a special session resource component 622 can be provided. In this way, subsequent requests for resources can be done in light of state information (e.g., a current position within a set of items) maintained in the session resource component 622. The session resource component 622 may be drawn from a pool of pre-created components to facilitate more efficient processing and then recycled back into the pool when the session is completed.

Two other resource components, the transaction repartitioning component 632 and the logical repartitioning component 642, can be used to support repartitioning operations in some systems. The transaction repartitioning component 632 may contain logic for handling repartitioning operations related to locking a collection of resource types at a single unit, such as a single resource server or database. The logical repartitioning component 642 may contain logic for handing repartitioning operations appropriate for a particular resource type within the collection.

In some cases, it may be desirable to combine component functionality from two or more components into a single component. For example, a single component could offer interfaces similar to those provided by the resource component 612 and the logical partitioning component 642.

The various interfaces provided by the resource components may differ according to scenario. An advantage of the above-described arrangement is that a standard interface can be provided by the resource component for requesting access to a resource. Another interface supports repartitioning operations. Preferably, the standard interfaces operate without regard to the type of resource involved. Under such an arrangement, the resource component encapsulates details for dealing with a particular resource type. In this way, a resource manager can be used in a system having a wide variety of resource types, and new resource types can be added after deployment of the system by developing a new resource component without reengineering the rest of the system.

Resource Administrator Overview

Figure 7:
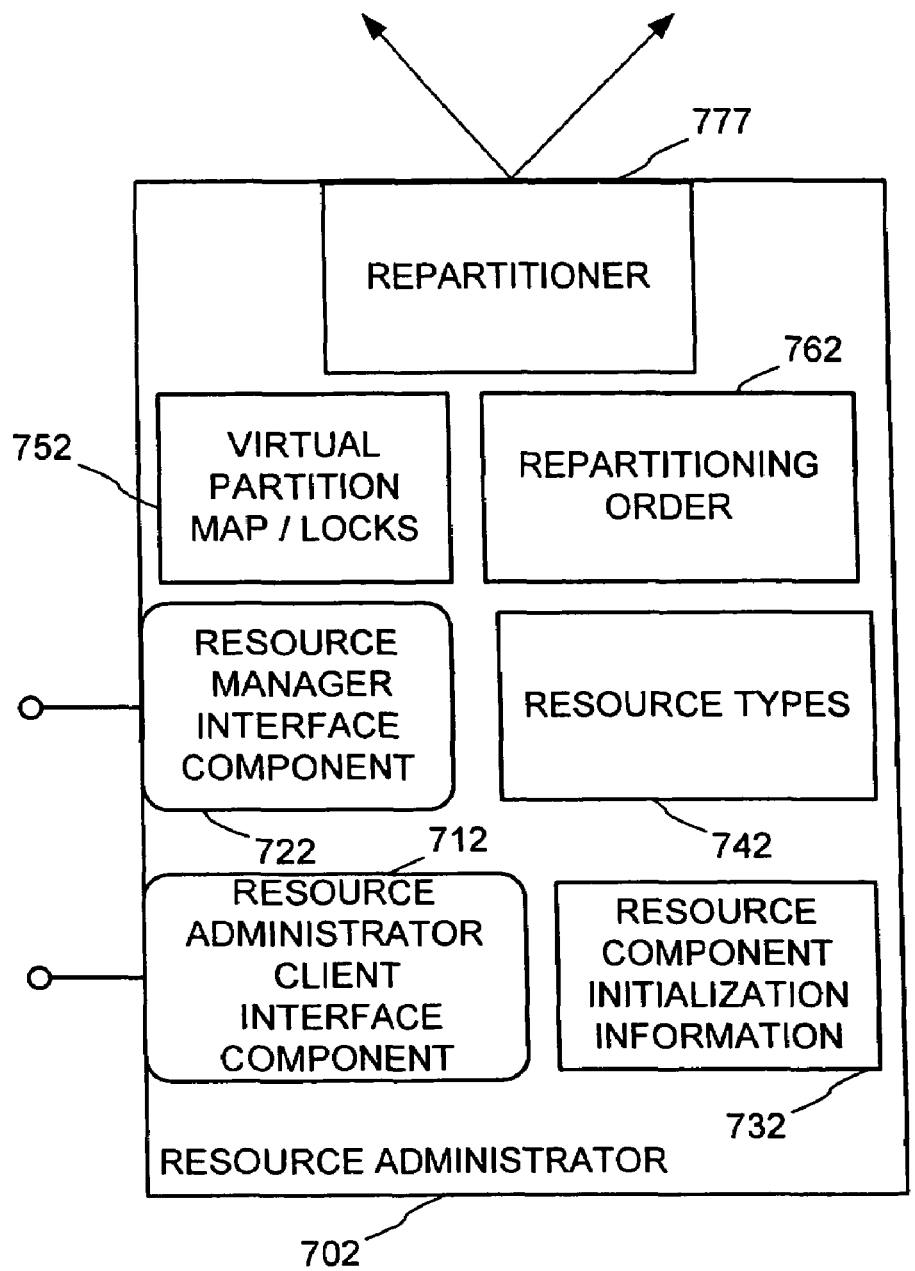
FIG. 7 is a block diagram showing an exemplary resource administrator for administering a virtual partition system.

FIG. 7 shows an example of a resource administrator 702. A resource administrator client interface component 712 provides an interface for receiving directives from a resource administrator client. A typical resource administrator client provides an interface for a user and can then relay the user's directives to the resource administrator client interface component 712. A resource manager interface component 722 provides an interface for receiving communications from the resource managers.

The resource component initialization information 732 includes information that can be sent to the resource managers when resource components are to be initialized. For example, a particular resource server might require a string having a username and password for a connection. The resource administrator can forward the string to the resource manager, which communicates the string to the resource component responsible for handling requests related to the associated resource server (e.g., when the component is first loaded). The resource manager need not have logic for interpreting the string, but merely passes it along to the resource component, which in turn passes it to the resource server.

The resource types information 742 includes information relating to each of the resource types. For example, when a resource manager first comes on line, it can be provided a list of the resource types for which it can expect to field requests.

The virtual partition table/locks information 752 contains a master copy of the virtual partition table, which relates virtual partition calculation values with resource servers. The table can be provided to resource managers so that the resource managers direct requests to the proper resource server via the resource components. The table includes locks so that repartitioning operations can be performed while avoiding synchronization problems.

The repartitioning order information 762 includes information indicating dependencies in data and can be used in some systems during repartitioning to ensure data is copied in the proper sequence. The repartitioner 777 includes logic for performing repartitioning of the virtual partition table, including orchestrating copying between resource servers. The repartitioner 777 may employ resource components to accomplish repartitioning. If the resource components encapsulate the details related to repartitioning for a particular resource type, the resource administrator can operate without regard to resource types, and new resource types can be incorporated into the architecture without reengineering the resource administrator.

Fielding a Request for a Resource Overview

Figure 8:
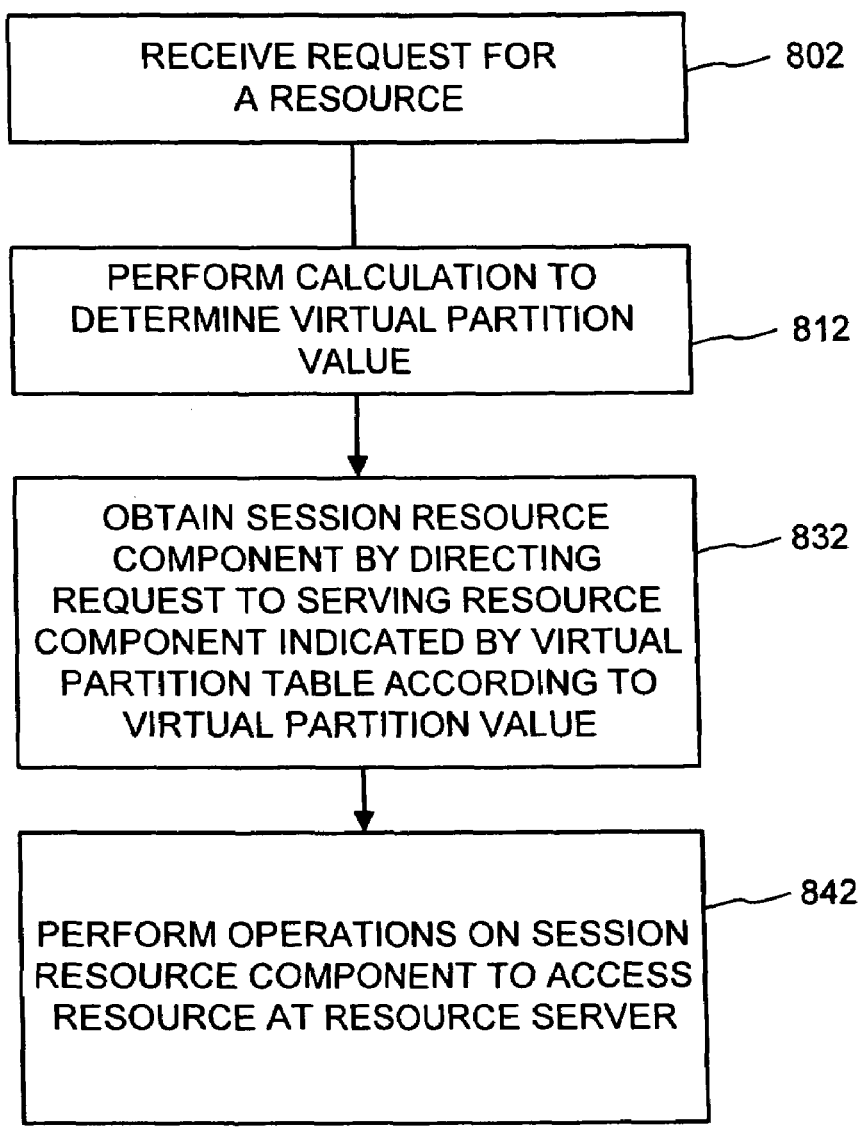
FIG. 8 is a flow chart showing a method for accessing a resource in a system such as that shown in FIG. 4.

FIG. 8 shows an overview of a method for fielding a request for a resource. Such a request is typically received by the resource manager at 802 and includes a key associated with the resource. Then, the key is used to perform a calculation to determine a virtual partition value at 812. Then, access to a session resource component is obtained by directing a request to the resource component indicated by the virtual partition table according to the virtual partition value at 832. The virtual partition table can thus be implemented as a table of references to resource components. An entry in the virtual partition table is sometimes called a bucket and resource components in different buckets can be initialized to point to different resource servers.

At 842 operations can then be performed on the session resource component to access a resource at a resource server. For example, various read, write, and display operations can be provided via session resource component functions. Although FIG. 8 describes a scenario in which the virtual partition table indicates a serving resource component, some system can use other information for accessing the particular server on which the resource server resides.

The key used in 812 can be of any number of formats. For example, a string might specify a particular location within a web site. In some cases, requesting a resource may cause a resource component to request a resource via the resource manager. In other words, a resource component may be a consumer of the services provided by the resource manager.

Repartitioning Overview

Figure 9:
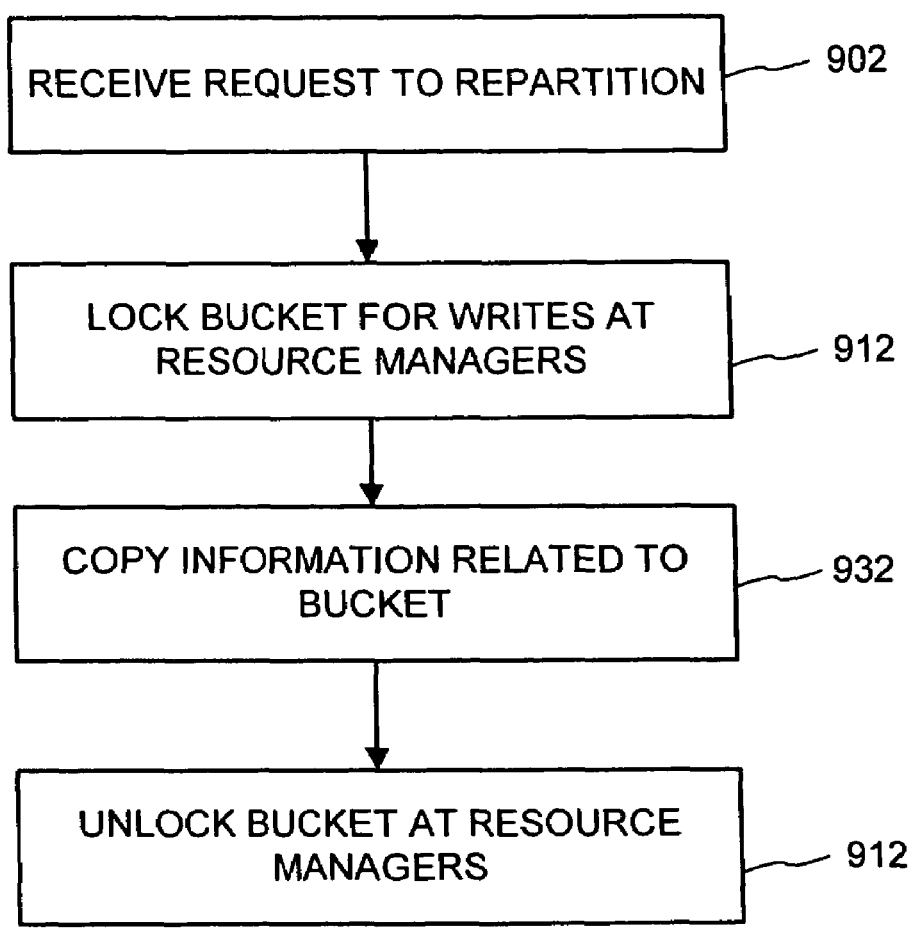
FIG. 9 is a flow chart showing a method for repartitioning resources in a system such as that shown in FIG. 4.

FIG. 9 shows an overview of a method for repartitioning resources according to the architecture. Typically, a request to repartition is received by the resource administrator at 902. The request might be initiated by a user via a resource administrator client and specify a bucket of the virtual partition table for which resources are to be moved to another resource server. For example, a new resource server can be added. Half of the buckets pointing to the old resource server can be pointed to the new resource server.

At 912, a bucket of the partition table is locked. Locking involves communicating an indication to the resource managers that write operations are not permitted to resources associated with the bucket. However, reads are permitted, and read access can continue during repartitioning.

Then, at 932, resources relating to the bucket are copied. Such copying typically also includes verifying the resources were copied correctly. At 942, the bucket is unlocked. Unlocking involves communicating an indication to the resource managers that writes are permitted to the resources associated with the bucket.

Various other steps not shown are typically also included, such as deleting the copied data from the old resource server and setting up a transaction mechanism to ensure data integrity. Such steps are described in more detail below.

Exemplary Implementation

The following describes an exemplary implementation in a web site environment to support a large set of online communities. The number of communities can grow to a very large number, and the popularity of any particular community can fluctuate. Accordingly, resources supporting the communities may need to be repartitioned to different groups of machines to ensure users visiting the communities experience consistent, quality service. An advantage of the described arrangement is that access to the communities can continue during repartitioning functions. Further, a large number of buckets is used. Therefore, repartitioning involves moving a very small percentage of the resources at any one time, and service to browsing users is disrupted for only very short periods of time.

Communities

Figure 10:
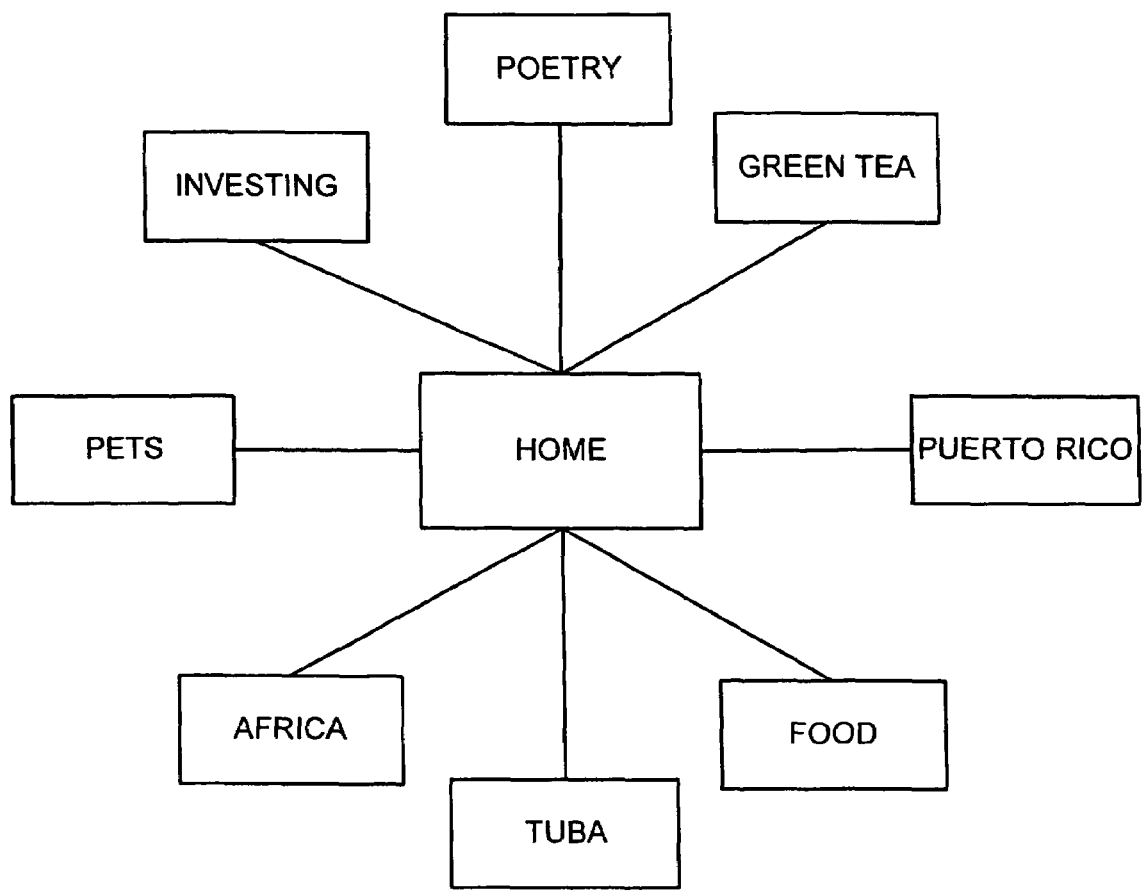
FIG. 10 is a block diagram of an online community center.

Although techniques relating to the invention can be applied to a variety of scenarios, one particularly beneficial application is in the field of online communities. As shown in FIG. 10, a service provider can provide a set of online communities in the form of a community center, which can be visited by any user having a web browser. To capture a user's interest, the communities typically relate to a particular category. A community center can have hundreds of communities covering a wide variety of subject matter.

Figure 11:
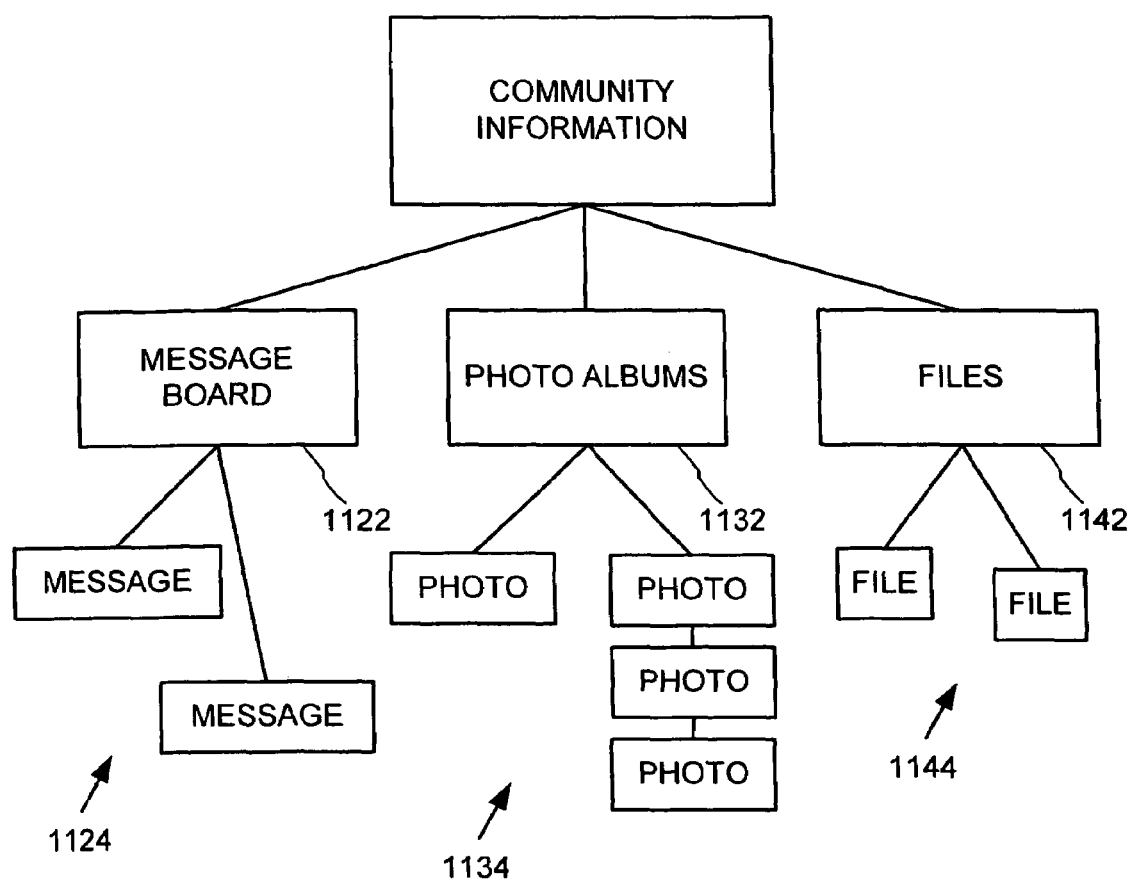
FIG. 11 is a block diagram showing information related to a particular community of the online community center of FIG. 10.

Each community can offer an online place for people to communicate and share information. For example, as shown in FIG. 11, the community can have general community information 1112, including a description of the community and an indication of the community's members. A message board 1122 can provide a list of messages. Members can read the messages 1124 and respond or expand.

Another community feature provides a list of photo albums 1132. The photo albums 1132 group together photographs 1134 for viewing by members, who can perform a variety of functions on the photographs 1134. Also, a file list 1142 allows community members to perform functions on files 1144.

As the number of communities and the number of people visiting the communities grow, the resources required to support the communities can become immense. Accordingly, the resources are partitioned using various techniques to provide consistent, quality service to persons visiting the communities.

Implementation of Architecture

In the example, resources for the communities include two main categories: resources drawn from SQL database servers (e.g., accessed with MICROSOFT OLE DB), and resources stored as sets of files (e.g., implemented as Universal Naming Convention (UNC) shares accessed by Server/Session Message Block (SMB)). In other scenarios, other protocols for accessing a resource server could be used (e.g., SOAP, DAV, MAPI, and CIFF).

Figure 12:
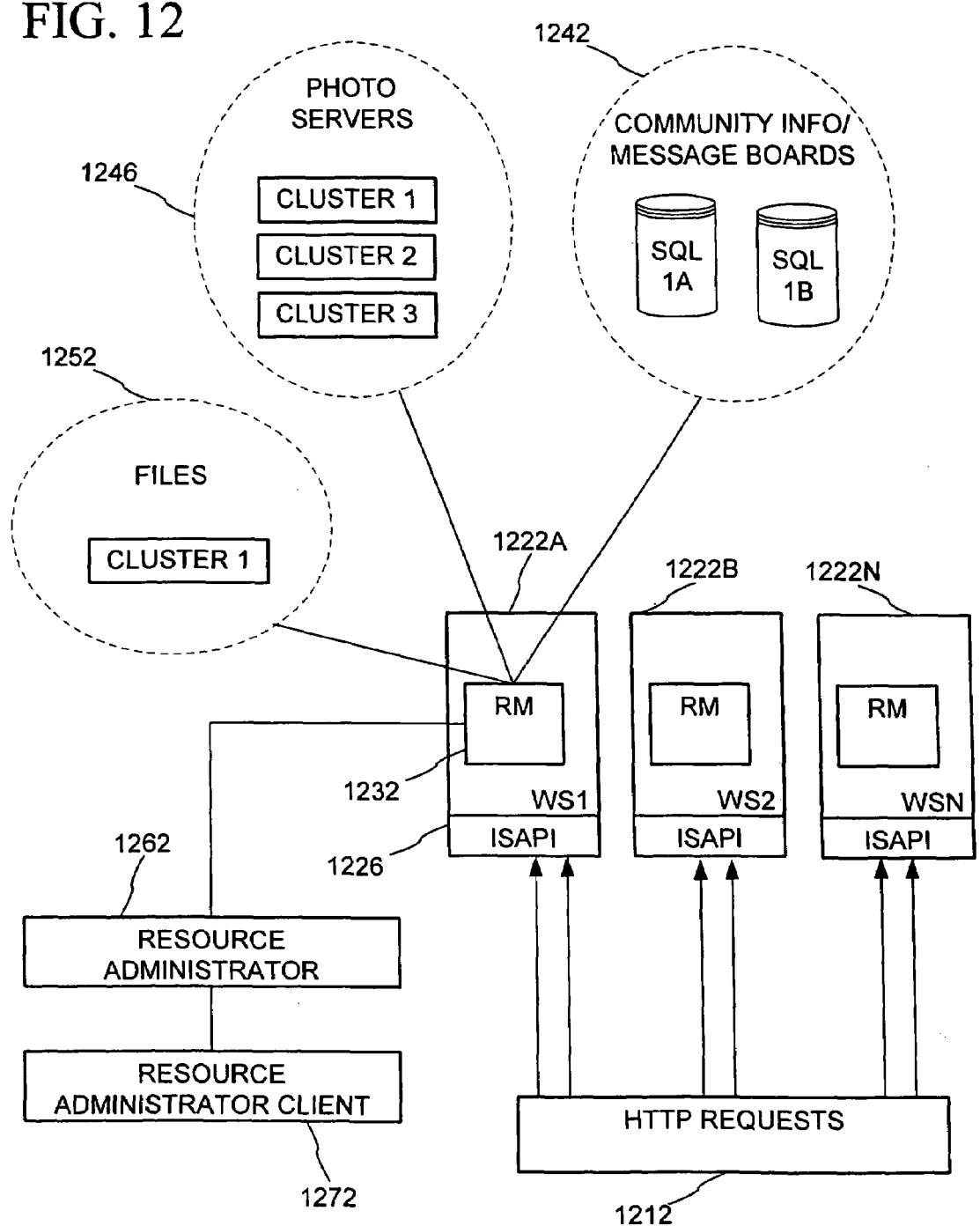
FIG. 12 is a block diagram showing an exemplary architecture for partitioning resources in an online community center such as that of FIG. 10.

FIG. 12 shows an exemplary architecture for implementing an online community center. HTTP Requests 1212 are directed to a number of web servers 1222A-1222N. Each of the web servers 1222A-1222N includes an HTTP request receiver and processor 1226 (e.g., the MICROSOFT Internet Information Server (IIS), including the MICROSOFT Internet Server API). To fulfill the HTTP requests, the web server can draw on a resource manager 1232 (e.g., installed on the machine as resmgr.dll).

Resources at the online community center include those provided by a set of SQL servers 1242 (e.g., SQL1A and SQL1B), which include general community information and message boards. A set of photo servers 1246 include a set of server clusters devoted to serving digital photographs related to photo albums. A set of file servers 1252 include a set of server clusters devoted to serving files related to file lists.

A resource administrator 1262 serves as a store for partitioning and resource type information consumed by the resource managers on the web servers 1222A-1222N. The resource administrator client 1272 provides a user interface for manipulating and monitoring the operation of the resource administrator 1262. Although connections are not shown, the resource administrator 1262 and resource administrator client 1272 may perform operations on the resource servers.

Resource Types

The resource types shown in the online community center are exemplary only and may change over the life of the online community center. For example, at some future date, it may become desirable to add a cluster of audio servers storing audio files related to a community.

In the illustrated implementation, there are two categories of resource types, physical and logical. The physical resource types are a broad category roughly corresponding to a cluster of resources (e.g., database-based and file-based). Logical resource types relate to resource are stored within a resource server of one of the physical resource types. Example logical resource types include photo albums, photographs, message boards, and files. One advantage of dividing the resources as described is that a particular server cluster can be optimized to serve a particular type of resource. For example, operations related to the photo servers 1246 may include specialized techniques for dealing with digital photographs.

Virtual Partition Table

Figure 13A:
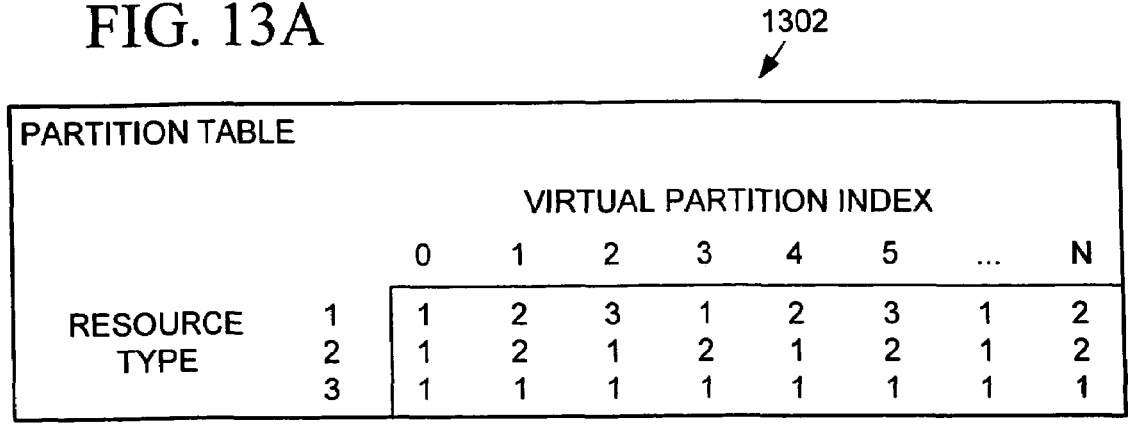
FIG. 13A is a diagram showing a virtual partition table.

In the illustrated example, the resource managers (e.g., 1232) include a virtual partition table 1302 as shown in FIG. 13A. The virtual partition table 1302 can be implemented as a two dimensional array having a size of the number of resource types in one dimension and the number of possible virtual partition values (e.g., possible index values) in the other dimension. In the example, the number of possible virtual partition values is 12,889, and the virtual partition value is determined by performing a hash function on the community name. Thus, the community name is sometimes called the partition key. Alternative partition keys include information related to a user (e.g., to allow a user to change her profile).

As shown generally in FIG. 13A, resources are partitioned by assigning the entries (or "buckets") of the virtual partition table 1302 to various resource servers. As shown in the example, there are three resource servers providing resources of type 1, and the buckets are divided evenly among the three servers. There are two servers providing resources of type 2, and the buckets are divided evenly between the two servers. There is only one server providing resources of type 3, and so all buckets are devoted to the one server.

Figure 13B:
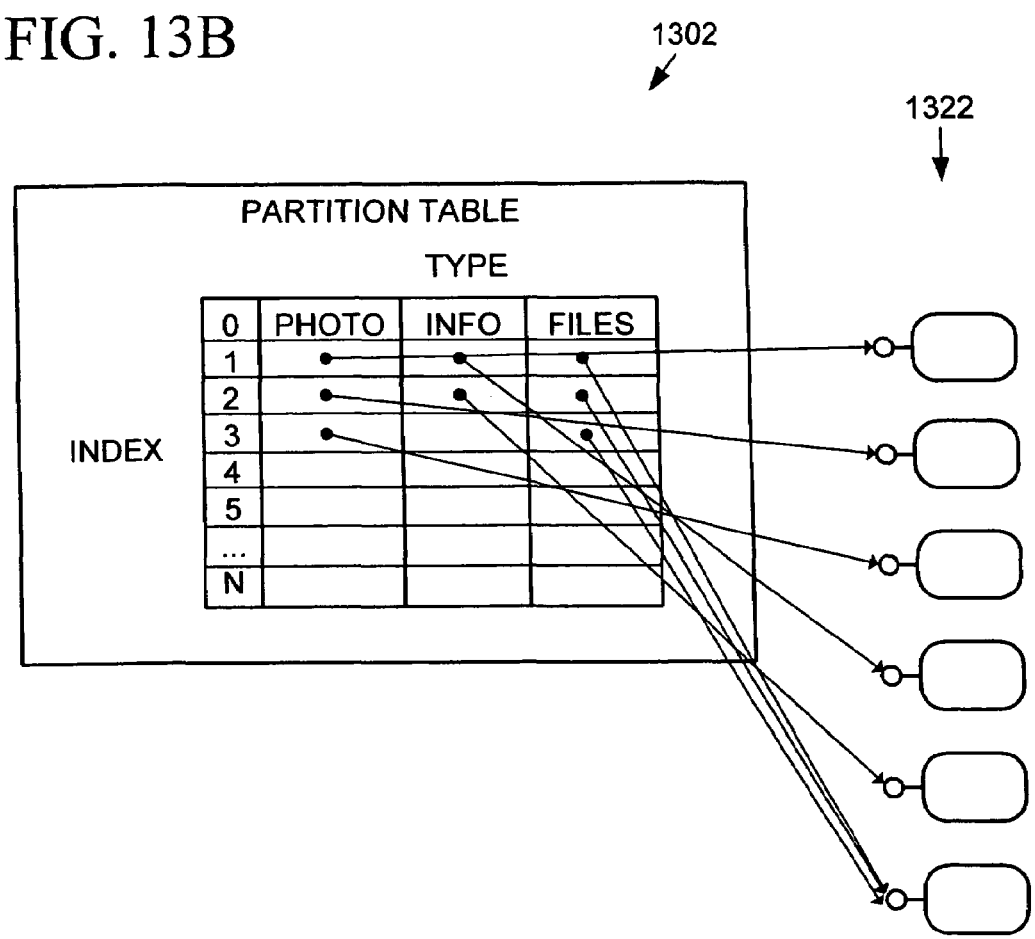
FIG. 13B is a diagram showing a virtual partition table and references to resource components.

In FIG. 13B, an illustration of the virtual partition table 1302 shows an alternative structure. Rather than simply storing a number indicating the content server, the virtual partition table includes a reference to a resource component related to the content server. In this way, each bucket in the virtual partition table 1302 is associated with one of the resource components 1322. The resource components 1322 are components of a class having logic for providing a way to access a resource server serving the appropriate resource type (e.g., by providing a session resource component). As shown, multiple buckets can refer to the same resource component. The reference to the resource component can take the form of an interface to the resource component. Each of the resource components includes at least one standard function, namely a function for handling a request for a resource. As a result of the above-described arrangement, the code shown in FIG. 14 can handle a request for a resource.

Thus, when a resource of a particular type relating to a particular community is desired, the resource manager calls a method of the resource component associated with the community (via a hashing function) and the resource type, to obtain information from the resource component for accessing the resource. Since each of the resource components 1322 referred to by the partition table 1302 includes a standard function, logic for dealing with the virtual partition table 1302 need not be tailored to accommodate a particular resource type. In other words, the resource components 1322 encapsulate the details relating to accessing a particular resource type.

In the illustrated architecture, the information returned by the standard function is a reference (e.g., interface) to a session resource component for providing access to the appropriate resource server. The provided session resource component may include special functions for handling the particular resource type. In some cases, the reference may be to the same resource component linked to the virtual partition table. Examples of resource components are provided in more detail below.

Resource Manager

The resource manager fields requests for resources and uses the virtual partition table to direct the requests to the appropriate resource server via the resource components.

In the example, the code listing shown in FIG. 15A shows the function GetResource provided by the resource manager to be called by a program wishing to obtain access to a particular resource. In the examples shown, the community name is used as the partition key. A hashing function shown in FIG. 15B is performed on the partition key to generate a number for indexing into the partition table (the virtual partition value), and the logic shown in FIG. 14 invokes a function on an appropriate resource component.

When the resource manager is started, it performs the following actions in order to prepare to field resource requests:

1. Register with the resource administrator to allow the resource administrator to send notifications. In this way, configuration changes relating to the resources and virtual partition table can be directed to the resource managers from the resource administrators.

2. Request the list of resource types from the resource administrator. Each resource type can be represented by a class identifier of a resource component that deals with the resources at runtime.

3. Create a multi-dimensional array of pointers, providing one row for each resource type; each row consists of 12,889 buckets (one for each virtual parition).

4. For each resource type, request the list of resource instances. A resource instance is specified by its type and a component specific initialization string (e.g., "SQL: [Server=CPDCSQLA01; Database=WSComm; Login=CommSA; . . . ]" The initialization string can thus map the resource component instantiation to a specificphysical resource having a resource server. The string is typically specific to the resource and need not be understood or processed by the resource manager, other than to pass the string to the resource component for use when accessing a resource.

A string is used to allow a wide variety of information; however, a different data structure (e.g., array or record) can be used in an alternative architecture.

5. For each resource instance, create a resource component (e.g., via CoCreateInstance) based on the resource type's CLSID and call an initialization function on the created object, passing the initialization string.

6. For each resource type, load the virtual partition table, which maps the virtual partitions to the resource components created above.

Resource Components

As described above, each of the resource components referred to in the virtual partition table supports at least two functions, one for initialization (e.g., via an initialization string) and one for obtaining a session resource component. In some cases (e.g., when state information is not necessary), a resource component may fulfill the request for a session resource component by providing a reference to itself. Operations can then be performed on a resource via the session resource component.

In the illustrated architecture, the two functions are grouped together in a public interface, IRMResource (e.g., derived from IUnknown), which is implemented by each of the resource components referred to in the virtual partition table. For example, a listing for a photo album resource component is shown in FIGS. 16-17. A call to IRMResource::GetResource provides a reference to a session resource component, namely a photo object. A listing of the photo object is shown in FIG. 18. The code for the various functions (e.g., the AddPhoto method) is constructed so that the data may reside on any physical store. The session resource component was pulled from a resource component encapsulating information about the physical store (which was provided to the resource component via the initialization string).

An example way of using resource components is shown in the code listing of FIG. 19. In the example, a program accesses a resource via the resource manager by calling the resource manager's GetResource function, which in turn forwards the call to the appropriate GetResource function of a resource component in the virtual partition table, which returns an interface to a photo resource component (the session resource component).

Functions to be performed on the resource (e.g., viewing, adding or deleting a photo) can be accomplished by directing calls to the provided interface to the session resource component. Although the session resource component may provide custom functionality, the resource component referenced in the virtual partition table need only provide a standard set of functions that take the same parameters, regardless of the resource type. In this way, new resource types can be added to the architecture without redesigning the way the resource manager interacts with the resource components.

An additional interface, IRMResource, is shown in FIG. 20 and includes functions for validating configuration and repartitioning, which is described in more detail below.

Resource Administrator

The resource administrator of the illustrated architecture maintains a master copy of the virtual partition table and orchestrates repartitioning as described in greater detail below. Various data structures defined for use with the resource administrator are shown in FIG. 21, and an interface IRMAdmin is shown in FIG. 22. IRMAdmin is provided for access by resource managers to obtain a list of resource types and the list of resources for a given type. Another interface IRMAdminOps is shown at FIGS. 23-24. IRMAdminOps is provided for access by a resource administrator client to perform various functions, including repartitioning.

Resource Administrator Client

In the illustrated implementation, a resource administrator client provides a graphical user interface and a command line interface for communicating with the resource administrator. An interface IRMAdminOpsSink can provide a communication path from the resource administrator to the resource administrator client.

The interface IRMAdminClient provides a set of functions that the user interface can call to accomplish a wide variety of tasks, such as adding new resource types, and migrating buckets to accomplish repartitioning. Code listings for the IRMAdminClient interface are shown at FIGS. 25-29. The part of the resource administrator client that performs tasks as directed by the user interface is sometimes called the "worker."

Repartitioning

In the illustrated implementation, repartitioning is initiated by a user who selects a repartitioning command via the resource administrator client. Repartitioning can be used under a variety of scenarios. For example, if a new resource server is being added to share the load of resource requests, repartitioning can be used to direct a percentage of the resource requests to the new resource server. Also, the buckets can be rebalanced among the existing resource servers or an existing resource server might be replaced with another.

A typical repartitioning command specifies that a particular bucket is to be moved to a specified destination resource server. The resource administrator client also provides a way to automate the process of adding a new resource server by translating a single "add resource server" command into multiple move bucket commands. For example, if a third resource server is being added to a web site, the resource administrator client can generate a move bucket command to move one-third of the buckets to the new resource server. The actual bucket numbers to be moved can be automatically randomly selected.

Figure 30:
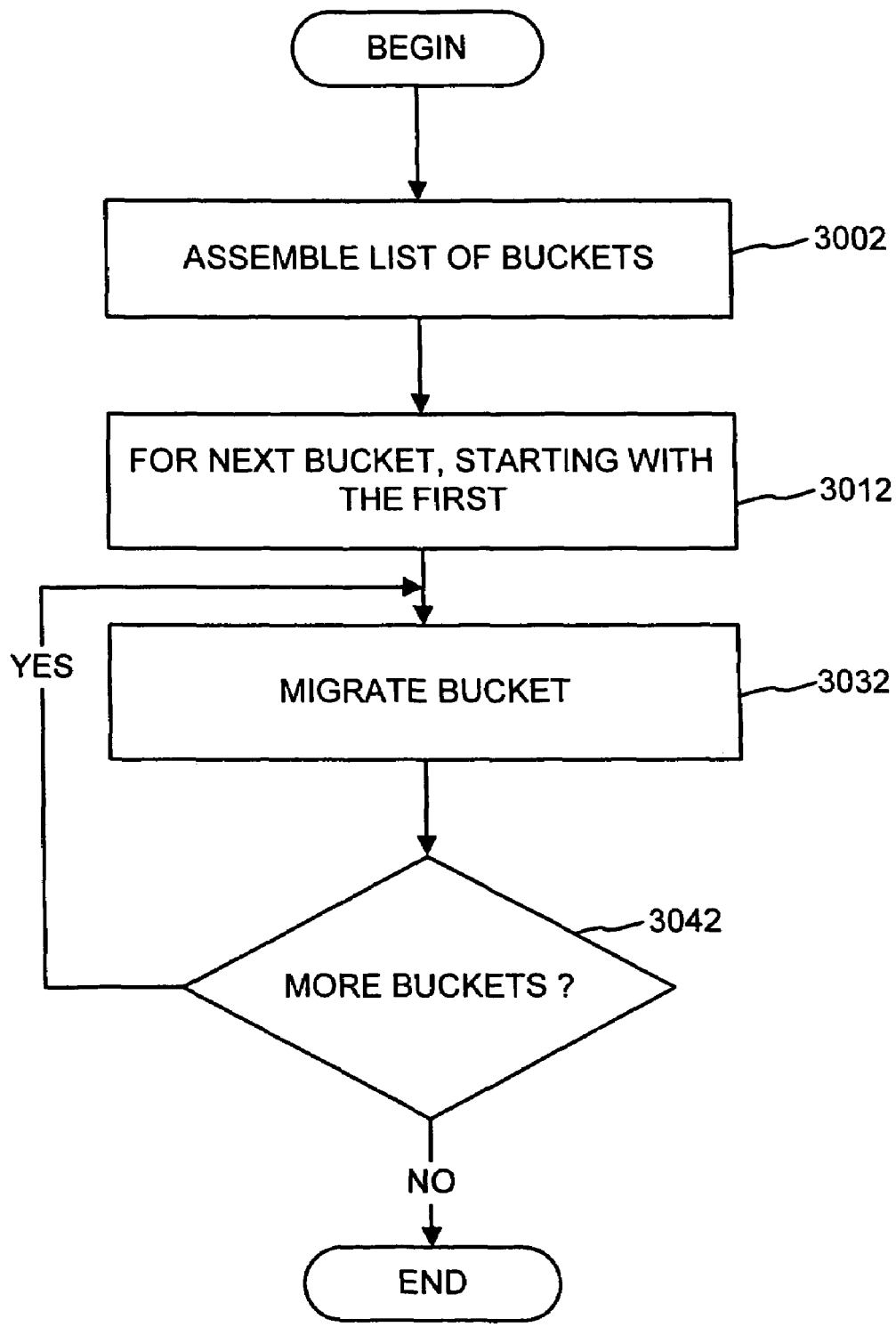
FIG. 30 is a flow chart showing a method for repartitioning resources.

A method for repartitioning in the illustrated implementation is shown in FIG. 30. At 3002, the list of buckets to be migrated is assembled. Typically, a bucket is denoted by a bucket number and a resource type because there are multiple buckets per bucket number. At 3012, the method starts with the first bucket. At 3032, the bucket is migrated as described in more detail below. If there are more buckets at 3042, the method loops using the next bucket at 3025. Otherwise, the method ends.

Figure 31:
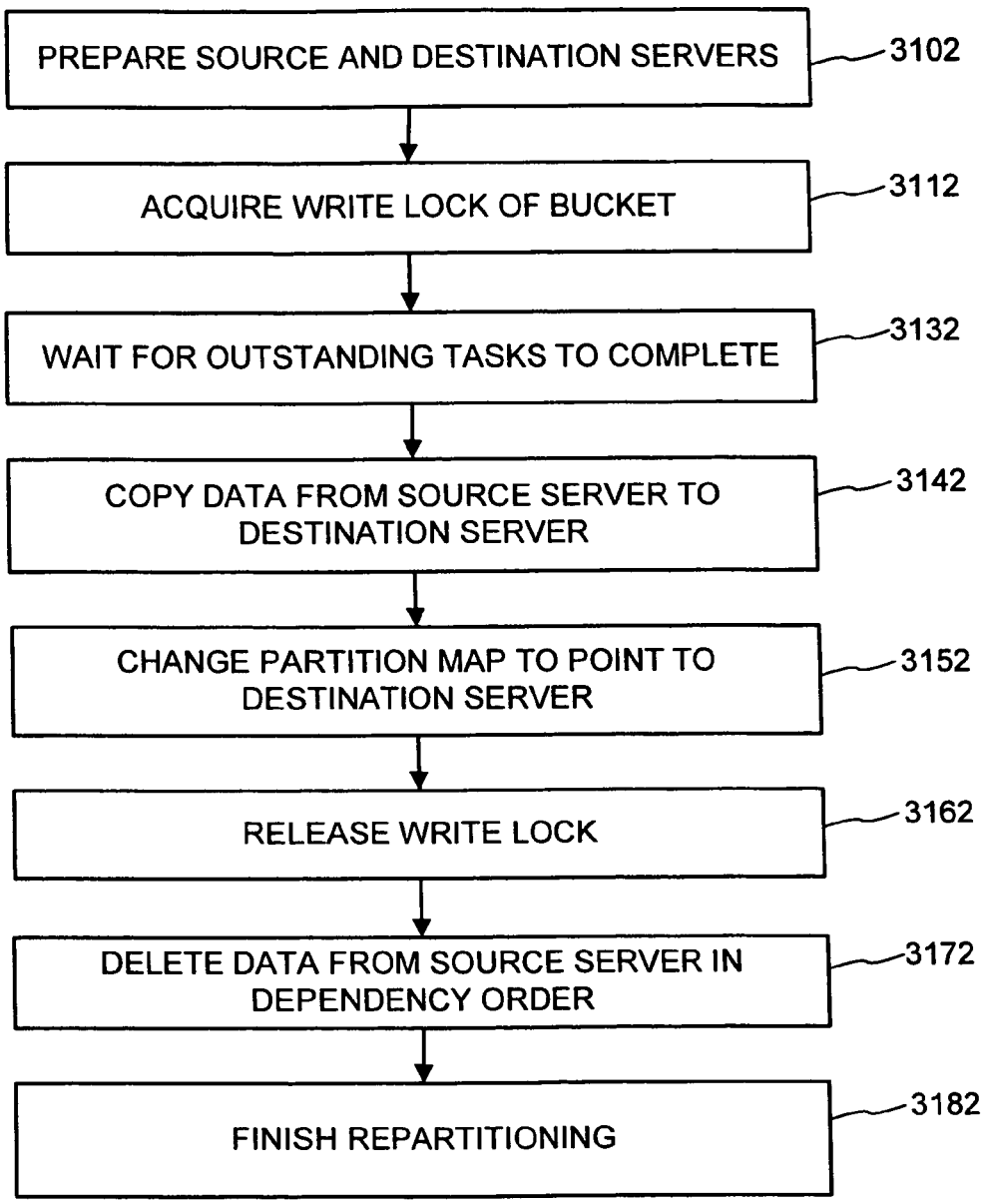
FIG. 31 is a flow chart showing a method for migrating a bucket in a virtual partition table.

Further detail concerning migrating a bucket is shown in FIG. 31. At 3102, the source and destination servers are prepared for the bucket migration. Typically, a transaction repartitioning resource component is created for the source and destination resource servers. In the illustrated implementation, the transaction repartitioning resource component is sometimes called a "physical" resource component because it roughly corresponds to a physical unit (e.g., one resource server cluster). The transaction repartitioning resource components support the IRMTransaction interface, which includes methods for beginning a transaction, rolling back the transaction, and committing the transaction. 3102 includes a call to begin the transaction. For example, if the resource server includes a SQL database, the transaction repartitioning resource component might begin a SQL transaction.

At 3112, a write lock is acquired for the bucket being migrated. The function IRMAdminOps::GetBucketWriteLock of the resource administrator returns a handle which is subsequently used to release the lock. Locks can be set to time out after a certain time period (e.g., an hour). Although the logic of the resource administrator will allow an unlimited number of locks, the resource administrator client typically limits the number of concurrent locks (e.g., a maximum of five concurrent locks). Locks are stored in a table in memory. If the resource administrator crashes, the table is released and the buckets are considered unlocked. The resource manager automatically attempts to reconnect to the resource administrator and reload information relating to the buckets.

The resource administrator propagates the lock to the individual resource managers via the function IRMAdminSink::UpdateWriteLock. Responsive to receiving an indication that a bucket is locked, the resource manager updates the virtual partition table to indicate the bucket is locked. Whenever a resource component is requested from a write-locked bucket, the resource manager will operate as usual, except that the flag (RM_FLAG_WRITE_LOCK (0x0100)) is passed to the component (e.g., either by an init method or via flags). The component is designed so as to not perform any writing operations when it is notified that the write lock is in effect. However, read operations can continue during repartitioning.

At 3132, the method waits for any outstanding tasks to complete any pending write operations. For example, a resource component created before a bucket was write locked may be about to perform a write operation. Although a count of unreleased resource components can be maintained to ensure there are no outstanding components (e.g., by waiting for the count to be zero), waiting a certain time period (e.g., four seconds) is usually sufficient.

At 3142, data relating to the bucket is copied from the source resource server to the destination resource server. Further details of the copy process are provided below. At 3152, the partition map is changed to point to the destination server and propagated to the individual resource managers. At 3162, the write lock acquired at 3112 is released. At 3172, the data on the source resource server relating to the migrated bucket is deleted in reverse dependency order. Dependency order is described in more detail in the description of copying data below. Then, at 3182, repartitioning is finished. Finishing typically includes committing any outstanding transactions by invoking IRMTransaction::Commit on the transaction repartitioning resource components.

Figure 32:
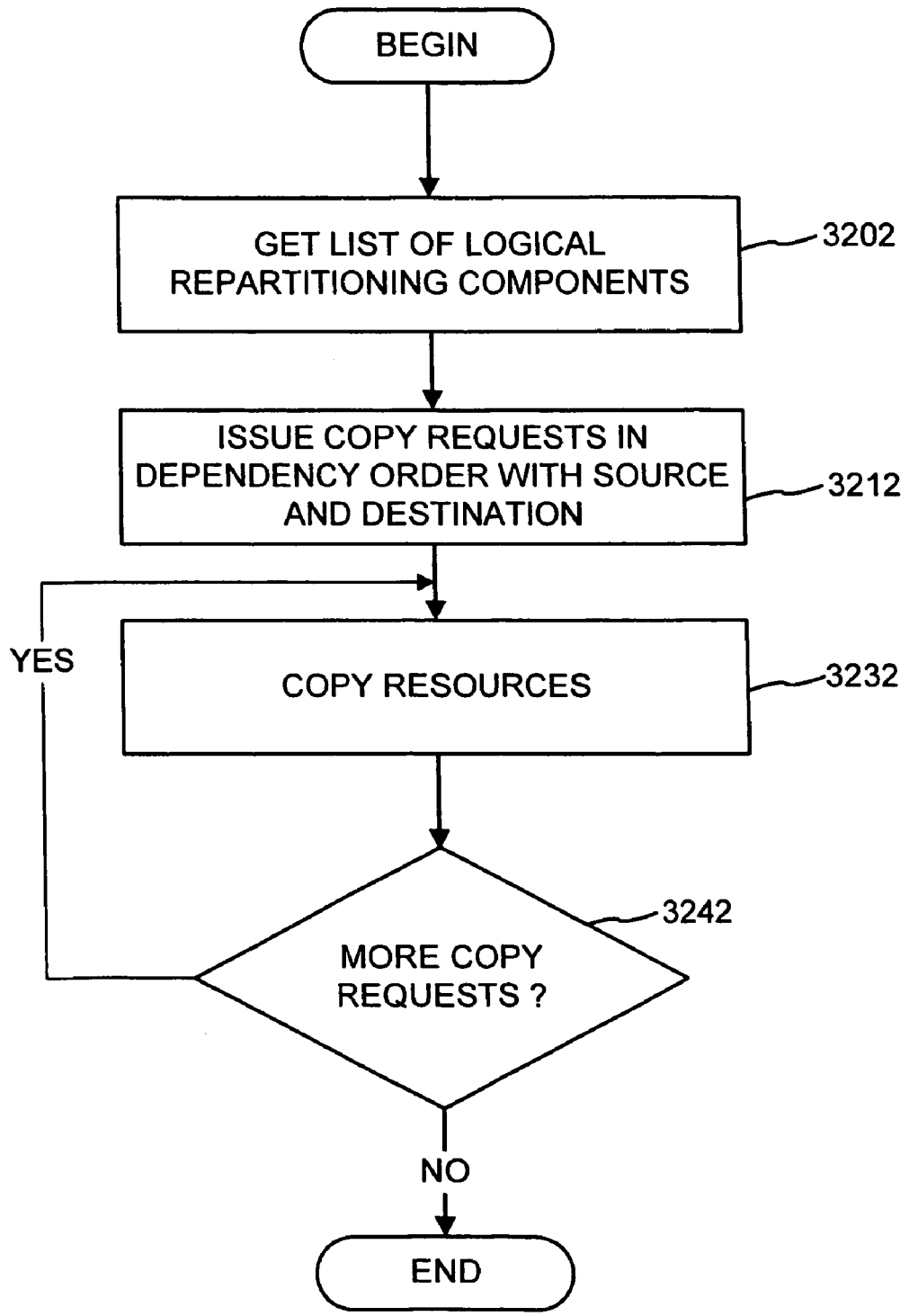
FIG. 32 is a flow chart showing a method for copying resources during bucket migration, such as that of FIG. 31.

Copying resources from the source resource server to the destination resource server can be accomplished by a method such as that shown in FIG. 32. In the illustrated implementation, a resource type can refer to either a physical or logical resource type. A physical resource type roughly corresponds to a physical unit (e.g., a SQL server cluster). A logical resource type specifies a particular type of resource (e.g., a digital photo or a message board). Thus, several logical resource types might be stored within a physical resource type. Each of the logical resource types has a corresponding logical repartitioning resource component that implements an interface IRMRepartitioning having the methods CopyBucket and DeleteBucket.

At 3202, a list of the logical repartitioning resource components relating to the physical resource type is assembled from a repartitioning order table. The repartitioning order table tracks which logical resource types are stored in a physical resource type and ensures dependencies in the data are preserved. At 3212, for each resource component appearing in the list, copy requests are issued in the order the components appear in the list. A resource component is created and IRMRepartitioning::CopyBucket is called, providing the source and destination transaction repartitioning resource components.

At 3232, the resources for the bucket relating to the resource type are copied. The resources involved are those with identifiers having a hash value corresponding to the bucket. To facilitate copying, the hash value can be stored with the data. For example, a field in a database might indicate the hash value. At 3242, if there are more resource components appearing in the list, the method continues at 3232. Otherwise, the method ends. Although the illustrated implementation uses physical and logical resource types, similar results can be achieved without categorizing resources as physical or logical. For example, all resource types could be called "physical" resource types.

Adding Resource Types

New resource types can be added via the resource administrator client. A class identifier of the resource component to be installed is specified to the resource administrator client, which makes appropriate calls to the resource administrator to register the new resource type.

Command Line Interface

The resource administrator client provides both a graphical user interface and a command line interface. Typically, various directives are scheduled in a queue until a "commit" command is issued. Various commands are shown in Table 1.

TABLE 1

Commands available at command line

| Description | Form | Example |
|---|---|---|
| reset (cancel) scheduled operations | RESET | RESET |
| commit (execute) scheduled operations | COMMIT | COMMIT |
| Add/remove a resource type (default is add) | [ADD | REMOVE] TYPE [{clsid} | {progid}] | TYPE Photo.RMPhotoAlbum |
| Add/change/remove resource server. The change command can take a resource server offline. | [ADD | CHANGE | REMOVE] RESOURCE {resid} [Type:{Typeid} [/InitInfo:{string}] [Status:[ACTIVE | OFFLINE] [/Commit] | ADD RESOURCE /Type:0 /InitInfo: "Server=Spidey1; Database=Dynacomm; User=Desiree; Pwd=Panama" |
| Migrate buckets; a number or percentage can be specified for BucketCount | MOVE BUCKETS TYPE {typeid} FROMRESOURCE {resid} TORESOURCE {resid} [/BucketCount:{number}] [/Commit] | MOVE BUCKETS TYPE 0 FROMRESROUCE 1 TO RESOURCE 2 /BucketCount: 40% |
| Query information about system. Default shows all items. | SHOW [TYPES | RESOURCES | BUCKETS |TASKS] | SHOW |

Interfaces of the Exemplary Implementation

Table 2 shows a list of interfaces provided by various elements of the exemplary implementation. In an alternative architecture, the functionality of the interfaces might be provided in another way (e.g., a set of functions or methods not necessarily grouped into an interface).

TABLE 2

Interfaces provided in the Exemplary Implementation

| Name | Implemented by | Description |
|---|---|---|
| IRMResource | Resource component | Initialize resource components in virtual partition table and provide reference to session resource component upon request |
| IRMResourceOps | Resource component | Provides functionality to move buckets |
| custom | Session resource component | Provides functionality for performing operations on a resource (e.g., functionality to access a UNC resource or functionality to access a photo album) |
| IRMTransaction | Transaction repartitioning (Physical) resource component | Begin, rollback, or commit transaction on resource server |
| IRMRepartitioning | Logical (Repartitioning) Resource Component | Copy information related to bucket to another resource server |
| IRMAdminSink | Resource Manager | Includes function UpdateWritelock to make sure any subsequent requests for components are write locked |
| IRMAdminOps | Resource Administrator | For use by Resource Administrator Client |
| IRMAdminClient | Resource Administrator Client | Includes command for migrating buckets |

Example Operation

Fielding a Request for a Resource

The following is provided as an example of operation only. The invention is not limited to the specifics described.

In an exemplary system using the principles outlined above, a browsing user can find her way to photo albums kept for a community dealing with green tea by pointing her web browser to http://content.communities.msn.com/GreenTea/PhotoAlbum.

A particular photo album is found by navigating to http://content.communities.msn.com/isapi/fetch.dll?action=get_album&ID_Community=GreenTea&ID_Topic=3.

When the above request is received by a web server in the web farm, it is received by logic for dealing with a "get_album" directive, which sends a request to the web server's resource manager. The request requests a resource component to handle photo album functions. The community name "GreenTea" is used as the partition key, and the resource type is PhotoAlbum. The resource manager performs a hash on the string "GreenTea" to generate a virtual partition value.

In the virtual partition table, a bucket for the virtual partition value and the resource type points to the interface of a component that returns a reference to a session component for dealing with photo albums. The component handles requests to view, add, or delete photos by manipulating data on a particular content server, as was determined by an earlier-supplied initialization string.

Requests for photo albums of another community (e.g., "Echinacea") are sent to the resource manager, which performs a hash on the community name. Since the bucket relating to photo albums for "Echinacea" points to a resource component referencing another content server, requests for resources are divided between two different servers. The resources for the two communities are thus partitioned. Further, resources of a different type (e.g., message boards) for the same community can be migrated to another content server if desired. Thus, partitioning within a community can also be accomplished.

Repartitioning Example

A web site is configured so that there are at least four resource types as shown in Table 3. Thus, the message boards, general community information, and photo albums are stored on a resource server of type "SQL1," a SQL database.

TABLE 3

Resource Types

| TypeId | Description | Physical? | ClsId |
|---|---|---|---|
| 0 | SQL1 | TRUE | {...} |
| 1 | MsgBoard | FALSE | {...} |
| 2 | CommInfo | FALSE | {...} |
| 3 | PhotoAlbum | FALSE | {...} |

The web site administrator sits at a computer and submits a request to move a set of buckets from a source resource server of type SQL1 (considered a "physical resource " type) to a destination resource server of type SQL1. The request is typed at a command line for submission to the resource administrator client.

The resource administrator client creates two instances of a transaction repartitioning resource component: one for the source and one for the destination. IRMTransaction::BeginTransaction is called on both components, and the resource administrator client reads the repartitioning Order Table for the resource types MsgBoard, commInfo, and PhotoAlbum, which are shown in Table 4.

TABLE 4

Repartitioning Order

| Physical TypeId | CompId |
|---|---|
| 0 | 2 [CommInfo] |
| 0 | 1 [MsgBoard] |
| 0 | 3 [PhotoAlbum] |

The first component in dependency order is CommInfo (first in the Table). The resource administrator client creates an instance of it and calls IRMRepartitioning::CopyData. The same is then done with the other two components, in order. After copying is over, calls are made in reverse order to IRMRepartitioning::DeleteData. If the operations succeed, the resource administrator client calls IRMTransaction::Commit on the source and destination resource components and releases them.

Alternatives

Having described and illustrated the principles of our invention with reference to illustrated embodiments, it will be recognized that the illustrated embodiments can be modified in arrangement and detail without departing from such principles. Although the illustrated architecture involves communities, the principles of the architecture can be applied to a wide variety of scenarios, such as a mail system (e.g., the partition key could be a user name), a file system (e.g., the partition key could be a filename, directory path, or combination of the two), or another collection of resources. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a distributed computing environment having a plurality of content server computer systems fielding requests for content from a plurality of content request handler computer systems, wherein a virtual partition system comprising a plurality of buckets resides at each of the content request handler computer systems and associates buckets with the content server computer systems, a method of adding an additional content server computer system to the plurality of content server computer systems fielding requests for content, the method comprising:

randomly selecting a set of at least one bucket to be moved from a source content server computer system in the plurality of content server computer systems to the additional content server computer system;

locking the set of at least one bucket to indicate write access is not permitted to content associated with the set of buckets;

while continuing to direct read requests for content via the locked buckets, copying content associated with the locked set of buckets to the additional content server computer system according to a data dependency order of the content;

associating the locked set of buckets with the additional content server computer system in the virtual partition system, the associating comprising placing a reference to a programming component in the set of buckets, wherein the programming component fields requests and directs the requests to the additional content server system;

unlocking the set of buckets;

after the buckets have been associated with the additional content computer system in the virtual partition system, directing requests for content to the additional content server computer system; and deleting the copied content from the source content server computer system data in a reverse order of the data dependency order of the content.

2. The method of claim 1 wherein the set of at least one bucket consists of one bucket.

3. The method of claim 1 wherein the additional content server computer system is devoted to serving a particular type of content and the virtual partition system determines a bucket based on type of content.

4. The method of claim 3 wherein the particular type of content is a digital photograph.

5. The method of claim 1 wherein associating the locked set of buckets with the additional content server computer system m the virtual partition system comprises:

instantiating a programming component of a class for fielding resource requests and having an initialization function accepting a mechanism for determining to where the resource request is to be directed; and submitting to the initialization function of the programming component, via the mechanism, an indication that the resource request is to be directed to the additional content server computer system.

6. The method of claim 1 wherein the programming component is customizable to direct requests to whatever server computer system is specified.

7. The method of claim 1 wherein the programming component supports an interface operable to direct requests independent of resource type and independent of server computer system identifier.

8. The method of claim 1 wherein the programming component supports an interface operable to direct requests regardless of resource type and regardless of server computer system.

9. The method of claim 1 wherein the reference to the programming component comprises an interface to the programming component.

10. One or more computer-readable media having computer-executable instructions for performing a method in a distributed computing environment having a plurality of content server computer systems fielding requests for content from a plurality of content request handler computer systems, wherein a virtual partition system comprising a plurality of buckets resides at each of the content request handler computer systems and associates buckets with the content server computer systems, the method comprising:

randomly selecting a set of at least one bucket to be moved from a source content server computer system in the plurality of content server computer systems to an additional content server computer system;

locking the set of at least one bucket to indicate write access is not permitted to content associated with the set of buckets;

while continuing to direct read requests for content via the locked buckets, copying content associated with the locked set of buckets to the additional content server computer system according to a data dependency order of the content;

associating the locked set of buckets with the additional content server computer system in the virtual partition system, the associating comprising placing a reference to a first programming component in the set of buckets, wherein the programming component fields requests and directs the requests to the additional content server computer system;

unlocking the set of buckets;

after the buckets have been associated with the additional content computer system in the virtual partition system, directing requests for content to the additional content server computer; and deleting the copied content from the source content server computer system data in a reverse order of the data dependency order of the content.

11. The one or more computer-readable media of claim 10 wherein the set of at least one bucket consists of one bucket.

12. The one or more computer-readable media of claim 10 wherein the additional content server computer system is devoted to serving a particular type of content and the virtual partition system determines a bucket based on type of content.

13. The one or more computer-readable media of claim 12 wherein the particular type of content is a digital photograph.

14. The one or more computer-readable media of claim 10 wherein associating the locked set of buckets with the additional content server computer system in the virtual partition system comprises:
  instantiating a second programming component of a class for fielding resource requests and having an initialization function accepting a mechanism for determining to where the resource request is to be directed; and
  submitting to the initialization function of the programming component, via the mechanism, an indication that the resource request is to be directed to the additional content server computer system.

15. The one or more computer-readable media of claim 10 wherein the programming component is customizable to direct requests to whatever server computer system is specified.

16. The one or more computer-readable media of claim 10 wherein the programming component supports an interface operable to direct requests independent of resource type and independent of server computer system identifier.

17. The one or more computer-readable media of claim 10 wherein the programming component supports an interface operable to direct requests regardless of resource type and regardless of server computer system.

18. The method of claim 10 wherein the reference to the programming component comprises an interface to the programming component.

19. In a distributed computing environment having a plurality of content server computer systems fielding requests for content from a plurality of content request handler computer systems, wherein a virtual partition system comprising a plurality of buckets resides at each of the content request handler computer systems and associates buckets with the content server computer systems, a computer system comprising:
  a processor configured to execute one or more software means:
  software means for randomly selecting a set of at least one bucket to be moved from a source content server computer system in the plurality of content server computer systems to an additional content server computer system;
  software means for locking the set of at least one bucket to indicate write access is not permitted to content associated with the set of buckets;
  software means for, while continuing to direct read requests for content via the locked buckets, copying content associated with the locked set of buckets to the additional content server computer system according to a data dependency order of the content;
  software means for associating the locked set of buckets with the additional content server computer system in the virtual partition system, wherein the associating comprises placing a reference to a programming component in the set of buckets, wherein the programming component fields requests and directs the requests to the additional content server system;
  software means for unlocking the set of buckets;
  software means for, after the buckets have been associated with the additional content computer system in the virtual partition system, directing requests for content to the additional content server computer; and
  software means for deleting the copied content from the source content server computer system data in a reverse order of the data dependency order of the content.

* * * * *

UNITED STATES PATENT AND TRADEMARK OFFICE
CERTIFICATE OF CORRECTION

| | |
|---|---|
| PATENT NO. | : 7,483,981 B2 |
| APPLICATION NO. | : 11/003798 |
| DATED | : January 27, 2009 |
| INVENTOR(S) | : Alexander T. Weinert et al. |

It is certified that error appears in the above-identified patent and that said Letters Patent is hereby corrected as shown below:

In column 24, line 3, in Claim 5, delete "m" and insert -- in --, therefor.

In column 24, line 59. in Claim 10, delete "computer;" and insert -- computer system, --, therefor.

In column 26, line 6, in Claim 19, delete "means:" and insert -- means; --, therefor.

In column 26, line 31, in Claim 19, delete "computer;" and insert -- computer system; --, therefor.

Signed and Sealed this
Third Day of May, 2011

David J. Kappos
*Director of the United States Patent and Trademark Office*